United States Patent
Zhang et al.

(10) Patent No.: US 12,185,428 B2
(45) Date of Patent: Dec. 31, 2024

(54) METHODS AND APPARATUSES FOR DATA TRANSMISSION AND RECEPTION

(71) Applicant: FUJITSU LIMITED, Kawasaki (JP)

(72) Inventors: Guoyu Zhang, Beijing (CN); Qinyan Jiang, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 599 days.

(21) Appl. No.: 17/136,617

(22) Filed: Dec. 29, 2020

(65) Prior Publication Data

US 2021/0120630 A1    Apr. 22, 2021

Related U.S. Application Data

(63) Continuation of application No. PCT/CN2018/098595, filed on Aug. 3, 2018.

(51) Int. Cl.
| | | |
|---|---|---|
| *H04W 88/08* | (2009.01) | |
| *H04W 16/14* | (2009.01) | |
| *H04W 72/0446* | (2023.01) | |
| *H04W 72/0453* | (2023.01) | |
| *H04W 72/1268* | (2023.01) | |
| *H04W 72/21* | (2023.01) | |

(Continued)

(52) U.S. Cl.
CPC ............ *H04W 88/08* (2013.01); *H04W 16/14* (2013.01); *H04W 72/0446* (2013.01); *H04W 72/0453* (2013.01); *H04W 72/1268* (2013.01); *H04W 72/21* (2023.01); *H04W 72/23* (2023.01); *H04W 72/535* (2023.01)

(58) Field of Classification Search
None
See application file for complete search history.

(56) References Cited

U.S. PATENT DOCUMENTS

| | | | |
|---|---|---|---|
| 2013/0301552 A1* | 11/2013 | Xu | ........................ H04W 48/12 370/329 |
| 2015/0350955 A1* | 12/2015 | Somasundaram | .... H04W 72/52 370/329 |
| 2018/0115347 A1* | 4/2018 | Yerramalli | .......... H04W 74/004 |

(Continued)

FOREIGN PATENT DOCUMENTS

| | | |
|---|---|---|
| CN | 102420681 A | 4/2012 |
| CN | 108024310 A | 5/2018 |

(Continued)

OTHER PUBLICATIONS

Notice of Reasons for Refusal issued by the Japan Patent Office for corresponding Japanese Patent Application No. 2020-573296, mailed on Feb. 8, 2022, with an English translation.

(Continued)

*Primary Examiner* — Anh Vu H Ly
(74) *Attorney, Agent, or Firm* — Myers Wolin, LLC

(57) ABSTRACT

Methods and apparatuses for data transmission and reception are provided. The method includes: transmitting data scheduling control information by a network device to a terminal equipment; transmitting first indication information used for indicating one or more frequency-domain bandwidth resources by the network device to the terminal equipment; and receiving by the network device the uplink data transmitted by the terminal equipment.

12 Claims, 11 Drawing Sheets

(51) Int. Cl.
*H04W 72/23* (2023.01)
*H04W 72/50* (2023.01)

(56) References Cited

U.S. PATENT DOCUMENTS

| | | | |
|---|---|---|---|
| 2018/0132137 A1 | 5/2018 | Dai et al. | |
| 2018/0132200 A1* | 5/2018 | Gheorghiu | H04W 72/1263 |
| 2018/0167901 A1* | 6/2018 | Wang | H04W 56/0045 |
| 2018/0255570 A1* | 9/2018 | Patil | H04W 74/006 |
| 2019/0261255 A1 | 8/2019 | You | |
| 2019/0261331 A1* | 8/2019 | Guthmann | H04L 5/0007 |
| 2020/0204325 A1* | 6/2020 | Liu | H04L 5/001 |
| 2020/0314809 A1* | 10/2020 | Zhang | H04W 72/04 |
| 2021/0212065 A1* | 7/2021 | Li | H04W 28/20 |
| 2022/0141770 A1* | 5/2022 | Ahn | H04W 52/0216 |
| | | | 370/318 |

FOREIGN PATENT DOCUMENTS

| | | | | |
|---|---|---|---|---|
| CN | 108243505 A | | 7/2018 | |
| EP | 3319384 A1 * | | 5/2018 | H04W 16/14 |
| WO | 2014/048155 A1 | | 4/2014 | |

OTHER PUBLICATIONS

LG Electronics, "HARQ operation and control signaling for autonomous UL access", Agenda Item: 6.2.2.2.2, 3GPP TSG-RAN WG1 Meeting #92, R1-1802154, Athens, Greece, Feb. 26-Mar. 2, 2018.
First Notification of Office Action and Search Report issued by the China National Intellectual Property Administration for corresponding Chinese Patent Application No. 201880094404.8, dated Mar. 1, 2023, with an English translation.
Extended European Search Report with the Supplementary Search Report and the European Search Opinion issued by the European Patent Office for corresponding European Patent Application No. 18928945.7, mailed on Mar. 7, 2022.
Qualcomm et al., "Way Forward on supporting trigger based two stage UL grants in eLAA", 3GPP TSG RAN WG1 #86, R1-16XXXX, Gothenburg, Sweden, Aug. 22-26, 2016.
Nokia et al., "On Two-Stage UL scheduling for eLAA", Agenda Item: 6.2.1.1, 3GPP TSG RAN WG1 Meeting #85, R1-164942, Nanjing, China, May 23-27, 2016.
Huawei et al., "Two-stage scheduling for eLAA", Agenda Item: 7.2.1.1, 3GPP TSG RAN WG1 Meeting #86, R1-166137, Gothenburg, Sweden, Aug. 22-26, 2016.
International Search Report and Written Opinion of the International Searching Authority issued by the State Intellectual Property Office of the P.R. China for corresponding International Patent Application No. PCT/CN2018/098595, mailed on Apr. 1, 2019, with an English translation.
Communication pursuant to Article 94(3) EPC issued by the European Patent Office for corresponding European Patent Application No. 18 928 945.7-1215, mailed on Jul. 21, 2023.
NTT Docomo, Inc., "Remaining details on PUSCH resource allocation and scheduling design for eLAA", Agenda Item: 7.2.1.1, 3GPP TSG-RAN WG1 Meeting #86, R1-167343, Gothenburg, Sweden, Aug. 22-26, 2016.
Second Notification of Office Action issued by the China National Intellectual Property Administration for corresponding Chinese Patent Application No. 201880094404.8, mailed on Nov. 17, 2023, with an English translation.

* cited by examiner

METHODS AND APPARATUSES FOR DATA TRANSMISSION AND RECEPTION

CROSS REFERENCE TO RELATED APPLICATIONS

This application is a continuation application of International Application No PCT/CN2018/098595 filed on Aug. 3, 2018, the contents of which are incorporated herein by reference.

TECHNICAL FIELD

This disclosure relates to the field of communication technologies, and in particular to methods and apparatuses for data transmission and reception.

BACKGROUND

In recent years, wireless communication technologies have developed rapidly, and the standardization of the 3rd Generation Partnership Project (3GPP) has been developed to Rel.15 (Release 15). Starting from Rel. 13, based on the consideration of further capacity expansion, studies of transmission by using unlicensed frequency bands have begun in the Long Term Evolution (LTE) technology. In order to ensure fairness in the use of unlicensed frequency bands and interference control, a listen-before talk (LBT) mechanism has been introduced, that is, before preparing to transmit data, an unlicensed access device monitors whether a target frequency band is occupied by other transmitted data.

Two types of LBT methods are provided in LTE standards:

first type of LBT: the device first detects whether a channel (or a frequency band) is in an idle state in a period of time, and when it is determined that the channel is in an idle state, the device still needs to detect in a time of a contention window; and if the channel is still idle in the contention window, the device transmits data by using the channel;

second type of LBT: the device continuously monitors the channel (or the frequency band) for 25 microseconds, and if it is determined to be idle, it directly transmits data by using the channel. After the device is connected to the unlicensed frequency band, an occupancy time should not exceed a maximum channel occupancy time (MCOT).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that at present, for uplink data transmission in unlicensed frequency bands, a network device and a terminal equipment sometimes are unable to obtain consistent information on actually used frequency domain bandwidth resources, resulting in low spectral resource utilization efficiency or high transmission latency.

Addressed to at least one of the above problems, embodiments of this disclosure provide methods and apparatuses for data transmission and reception.

According to a first aspect of the embodiments of this disclosure, there is provided a method for data reception, including:

transmitting data scheduling control information by a network device to a terminal equipment, the data scheduling control information being used to indicate the terminal equipment related information for transmitting an uplink data;

transmitting first indication information used for indicating one or more frequency-domain bandwidth resources by the network device to the terminal equipment; and receiving, by the network device, the uplink data transmitted by the terminal equipment.

According to a second aspect of the embodiments of this disclosure, there is provided an apparatus for data reception, including:

an information transmitting unit configured to transmit data scheduling control information to a terminal equipment, the data scheduling control information being used to indicate the terminal equipment related information for transmitting an uplink data;

an indication transmitting unit configured to transmit first indication information used for indicating one or more frequency-domain bandwidth resources to the terminal equipment; and a data receiving unit configured to receive the uplink data transmitted by the terminal equipment.

According to a third aspect of the embodiments of this disclosure, there is provided a method for data transmission, including:

receiving, by a terminal equipment, data scheduling control information transmitted by a network device, the data scheduling control information being used to indicate a terminal equipment related information for transmitting an uplink data;

receiving, by the terminal equipment, first indication information used for indicating one or more frequency-domain bandwidth resources and transmitted by the network device; and transmitting the uplink data by the terminal equipment to the network device.

According to a fourth aspect of the embodiments of this disclosure, there is provided an apparatus for data transmission, including:

an information receiving unit configured to receive data scheduling control information transmitted by a network device, the data scheduling control information being used to indicate a terminal equipment related information for transmitting an uplink data;

an indication receiving unit configured to receive first indication information used for indicating one or more frequency-domain bandwidth resources and transmitted by the network device; and a data transmitting unit configured to transmit the uplink data to the network device.

According to a fifth aspect of the embodiments of this disclosure, there is provided a method for data reception, including:

transmitting data scheduling control information by a network device to a terminal equipment, the data scheduling control information being used to indicate the terminal equipment related information for transmitting an uplink data;

receiving, by the network device, the uplink data transmitted by the terminal equipment; and receiving, by the network device, first indication information used for indicating one or more frequency-domain bandwidth resources transmitted by the terminal equipment.

According to a sixth aspect of the embodiments of this disclosure, there is provided an apparatus for data reception, including:

an information transmitting unit configured to transmit data scheduling control information to a terminal equipment, the data scheduling control information being used to indicate the terminal equipment related information for transmitting an uplink data;

a data receiving unit configured to receive the uplink data transmitted by the terminal equipment; and an indication receiving unit configured to receive first indication information used for indicating one or more frequency-domain bandwidth resources transmitted by the terminal equipment.

According to a seventh aspect of the embodiments of this disclosure, there is provided a method for data transmission, including:

receiving, by a terminal equipment, data scheduling control information transmitted by a network device, the data scheduling control information being used to indicate a terminal equipment related information for transmitting an uplink data;

transmitting the uplink data by the terminal equipment to the network device; and transmitting first indication information used for indicating one or more frequency-domain bandwidth resources by the terminal equipment to the network device.

According to an eighth aspect of the embodiments of this disclosure, there is provided an apparatus for data transmission, including:

an information receiving unit configured to receive data scheduling control information transmitted by a network device, the data scheduling control information being used to indicate a terminal equipment related information for transmitting an uplink data;

a data transmitting unit configured to transmit the uplink data to the network device; and an indication transmitting unit configured to transmit first indication information used for indicating one or more frequency-domain bandwidth resources to the network device.

According to a ninth aspect of the embodiments of this disclosure, there is provided a communication system, including:

a network device, including the apparatuses for data reception as described above; and a terminal equipment, including the apparatuses for data transmission as described above.

An advantage of the embodiments of this disclosure exists in that the network device transmits first indication information used for indicating one or more frequency-domain bandwidth resources to the terminal equipment, or the terminal equipment transmits first indication information used for indicating one or more frequency-domain bandwidth resources to the network device. Hence, the network device and the terminal equipment may make an agreement on actually used frequency domain bandwidth resources, efficiency of utilization of spectral resources may be improved, transmission latency may be reduced, and flexibility of scheduling may be ensured.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
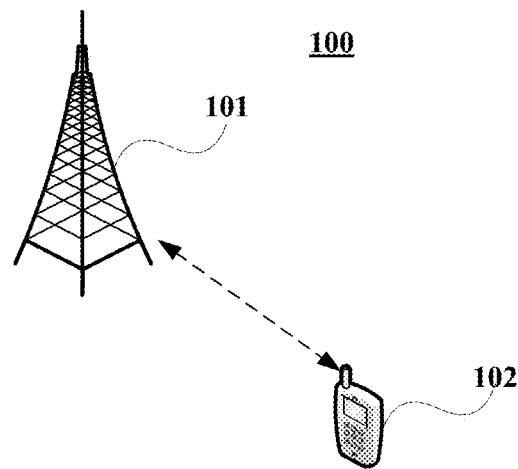
FIG. 1 is a schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a dedicated geographical area. And a term "cell" may refer to a base station and/or its coverage area, which is dependent on a context of the term.

In the embodiments of this disclosure, the term "user equipment (UE)" or "terminal equipment (TE) or terminal device" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102. For the sake of simplicity, an example having only one terminal equipment and one network device is schematically given in FIG. 1; however, the embodiment of this disclosure is not limited thereto.

In the embodiment of this disclosure, existing traffics or traffics that may be implemented in the future may be performed between the network device 101 and the terminal equipment 102. For example, such traffics may include but not limited to an enhanced mobile broadband (eMBB), massive machine type communication (MTC), and ultra-reliable and low-latency communication (URLLC), etc.

An uplink transmission mechanism on unlicensed frequency bands is introduced into Rel. 14 in the LTE technology, and four types of new formats of downlink control information (DCI), DCI format 0A/4A/0B/4B, are introduced for uplink scheduling instruction on the unlicensed frequency bands. What is scheduled by the 0A/0B format is a single antenna port transmission mode, what is scheduled by the 4A/4B format is a multi-antenna port transmission mode, what is scheduled by the 0A/4A format is a single subframe physical uplink shared channel (PUSCH) transmission mode, and what is scheduled by the 0B/4B format is a consecutive multi-subframe PUSCH transmission mode.

Scheduling signaling includes a PUSCH trigger A' field, which is used to indicate whether this time of scheduling is triggering scheduling. For example, if "0" is set to indicate that it is not triggering scheduling (non-triggering scheduling), after the scheduling signaling is received, a terminal equipment transmits a PUSCH according to timing indicated by a "Timing offset" field in the scheduling signaling; if "1" is set to indicate that this time of scheduling is triggering scheduling, the terminal device needs to wait for receiving DCI format IC signaling (triggering signaling) scrambled by a CC-RNTI, and if a "PUSCH trigger B" field in the received triggering signaling is set to be "1", it indicates that uplink scheduling is triggered, and the terminal equipment will determine a subframe for transmitting the PUSCH according to timing indicated by the "Timing offset" field in the scheduling signaling (DCI format 0A/4A/0B/4B) and a "UL duration and offset" field in the triggering signaling (DCI format IC).

Figure 2:
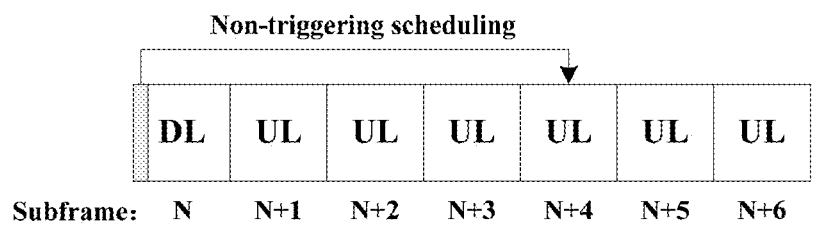
FIG. 2 is a schematic diagram of a non-triggering scheduling mode.

FIG. 2 is a schematic diagram of a non-triggering scheduling mode. As shown in FIG. 2, a minimum time interval from uplink scheduling signaling to transmission of a scheduled PUSCH in LTE is of 4 subframes. This scheduling time limit restricts flexibility of uplink scheduling. For example, in case of scheduling within the same frame, former four subframes cannot be scheduled to transmit uplink data; especially in an unlicensed frequency band, a device cannot schedule adjacent subframes after accessing to a channel, which will cause resource waste and time delay. Therefore, a triggering scheduling mode is added in LTE so as to transmit scheduling signaling in advance.

Figure 3:
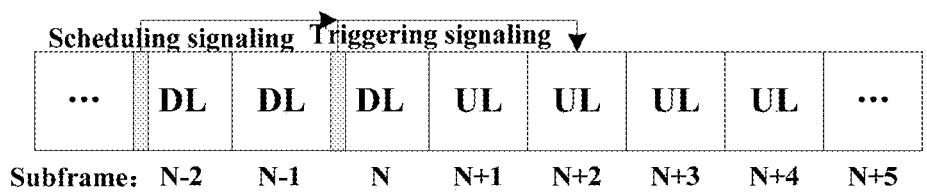
FIG. 3 is a schematic diagram of a triggering scheduling mode.

FIG. 3 is a schematic diagram of a triggering scheduling mode. As shown in FIG. 3, the network device may transmit scheduling signaling to the terminal equipment in advance; when the network device accesses to a channel, it transmits triggering signaling to the terminal equipment to trigger transmission of uplink data, which increases flexibility of uplink scheduling.

Furthermore, in order to meet a demand for OCB/PSD, interlace is used as a basic unit of uplink transmission resource allocation in eLAA. An interlace is composed of 10 resource blocks (RBs), which are distributed in a 20 MHz bandwidth at equal spaces. For example, interlace 0 is composed of RB0, RB10, RB20, . . . RB90. The network device allocates one or more interlaces to the terminal equipment via uplink scheduling signaling for the terminal equipment to perform uplink data transmission.

An unlicensed frequency band physical layer access technique based on New Radio (NR) has been discussed from RAN1 #92 meeting, and it was clearly pointed out that application of NR wideband (frequency domain bandwidth greater than 20 MHz) transmission technology in an unlicensed frequency band needs to be discussed, and it is stipulated that a transmission bandwidth of the NR unlicensed frequency band should be an integer multiple of 20 MHz when it cannot be ensured that there is no coexistence of other transmission techniques, because 20 MHz is also taken as a unit for transmission bandwidths of other unlicensed frequency band transmission techniques, such as WiFi.

However, in case of wideband transmission, if the network device schedules wideband resources to transmit data, but only a part of the wideband resources in an LBT monitoring result are idle, whether to perform data transmission becomes a problem needing to be solved. If transmission of data is abandoned, it will cause resource waste on the bandwidth in the idle state, and data can be transmitted only when whole wideband resources are in idle states, which will cause transmission delay. If data are transmitted only on bandwidth resources in idle states, if it is downlink transmission, there will be no time to modify and reorganize information related to scheduling bandwidth resources in the scheduling signaling, and inconsistency between an actual transmission bandwidth and a scheduled bandwidth will cause a failure of data decoding at a receiver side; and if it is uplink transmission, the bandwidth transmission in the idle states only will be inconsistent with indication of uplink scheduling signaling.

Therefore, there is a need to study transmission scheduling indications on unlicensed frequency bands, so as to improve efficiency of utilization of spectral resources, reduce transmission latency, and ensure flexibility of scheduling.

It should be noted that the embodiments of this disclosure are described by taking unlicensed frequency bands and LBT as examples; however, this disclosure is not limited thereto, and is also applicable to other scenarios where similar problems exist.

Embodiment 1

The embodiments of this disclosure provide a method for data reception, which is described from a network device side. The embodiments in Embodiment 1 and Embodiment 2 may be referred to as triggering scheduling modes.

Figure 4:
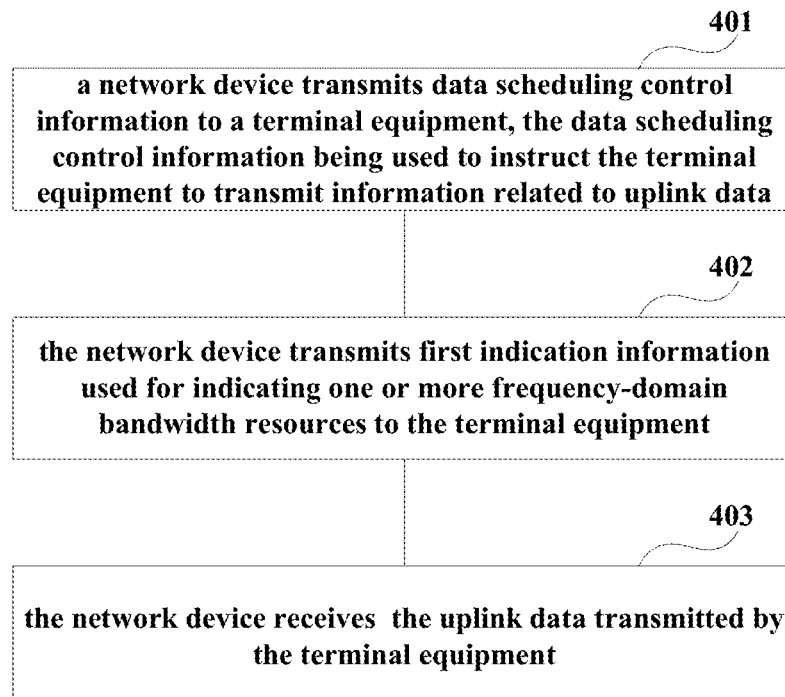
FIG. 4 is a schematic diagram of a method for data reception of an embodiment of this disclosure.

FIG. 4 is a schematic diagram of a method for data reception of the embodiment of this disclosure. As shown in FIG. 4, the method for data reception includes:

step 401: a network device transmits data scheduling control information to a terminal equipment, the data scheduling control information being used to indicate the terminal equipment related information for transmitting an uplink data;

step 402: the network device transmits first indication information used for indicating one or more frequency-domain bandwidth resources to the terminal equipment; and step 403: the network device receives the uplink data transmitted by the terminal equipment.

In an embodiment, the frequency domain bandwidth resources are frequency domain resources having certain frequency band bandwidths.

In an embodiment, the network device receives the uplink data on an unlicensed frequency band, and transmits the first indication information (which may also be referred to as frequency domain bandwidth resource indication or transmission bandwidth indication) and/or the data scheduling control information on an unlicensed frequency band or a licensed frequency band.

In an embodiment, the network device detects a channel of the unlicensed frequency band to determine the one or more frequency domain bandwidth resources; the first indication information may further be used to indicate that the one or more frequency domain bandwidth resources are at least one of the following: a bandwidth resource for the terminal equipment to transmit uplink data, a bandwidth resource for the network device to transmit downlink data, and a bandwidth resource for the terminal equipment to share a channel occupancy time of the network device to transmit uplink data.

The terminal equipment may receive the data scheduling control information (which may also be referred to as scheduling signaling, or uplink scheduling signaling, or data scheduling signaling, for example), the data scheduling control information further including indication information (which may also be referred to as available time-frequency resource information, for example, which includes an index of an available resource block, etc.) indicating an available time-frequency resource that may be used by the terminal equipment to transmit uplink data on the scheduling bandwidth resources. The terminal equipment may be triggered by a piece of triggering information (which may also be referred to as triggering signaling, or data triggering signaling, or uplink data triggering signaling, for example) carrying the frequency domain bandwidth resource indication to perform uplink data transmission, and then transmits the uplink data on available time-frequency resources in bandwidths where the available time-frequency resources indicated by the data scheduling control information and the one or more frequency domain bandwidth resources indicated by the first indication information coincide (or overlap).

If the available time-frequency resources indicated by the data scheduling control information and the one or more frequency domain bandwidth resources indicated by the first indication information have no coincided resources, the terminal equipment will not transmit uplink data scheduled by the data scheduling control information (or scheduling signaling), or, after receiving first indication information having resources coincided with the available time-frequency resources indicated by the data scheduling control information (or scheduling signaling), it transmits the uplink data on the coincided resources.

Thus, the network device transmits the first indication information used for indicating one or more frequency-domain bandwidth resources to the terminal equipment, and the network device and the terminal equipment may make an agreement on actually used frequency domain bandwidth resources, thereby improving efficiency of utilization of spectral resources, reducing transmission latency, and ensuring flexibility of scheduling.

In an embodiment, the first indication information is transmitted after the data scheduling control information. However, this disclosure is not limited thereto, and as described in the following embodiments, the first indication information may also be transmitted before the data scheduling control information, or there is no specific timing relationship between transmission of the first indication information and transmission of the data scheduling control information.

In an embodiment, the first indication information is included in the first control information carrying uplink data triggering information, the uplink data triggering information being used to trigger the terminal equipment to transmit the uplink data.

Figure 5:
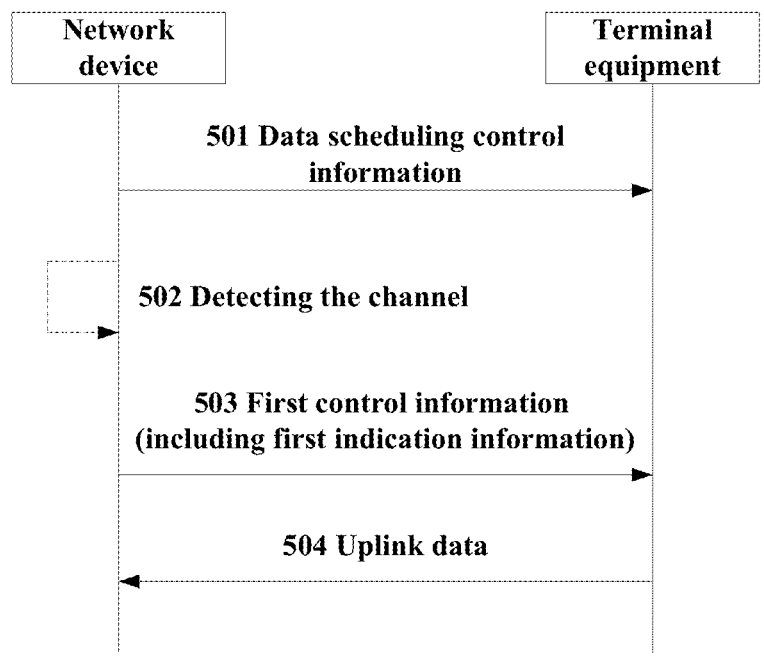
FIG. 5 is a schematic diagram of a method for data transmission and reception of an embodiment of this disclosure.

FIG. 5 is a schematic diagram of a method for data transmission and reception of the embodiment of this disclosure. As shown in FIG. 5, the method for data transmission and reception includes:

step 501: the network device transmits the data scheduling control information to the terminal equipment, the data scheduling control information being used to indicate the terminal equipment related information for transmitting an uplink data;

step 502: the network device detects a channel of an unlicensed frequency band to determine one or more frequency domain bandwidth resources;

step 503: the network device transmits the first control information including uplink data triggering information to the terminal equipment, the first control information including the first indication information indicating the one or more frequency domain bandwidth resources; and step 504: the terminal equipment transmits the uplink data to the network device on the available time-frequency resources in the bandwidths where the available time-frequency resources indicated by the data scheduling control information and the one or more frequency domain bandwidth resources indicated by the first indication information coincide.

It should be noted that FIG. 5 only schematically illustrate the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 5.

In an embodiment, the first indication information is included in second control information different from the first control information.

Figure 6:
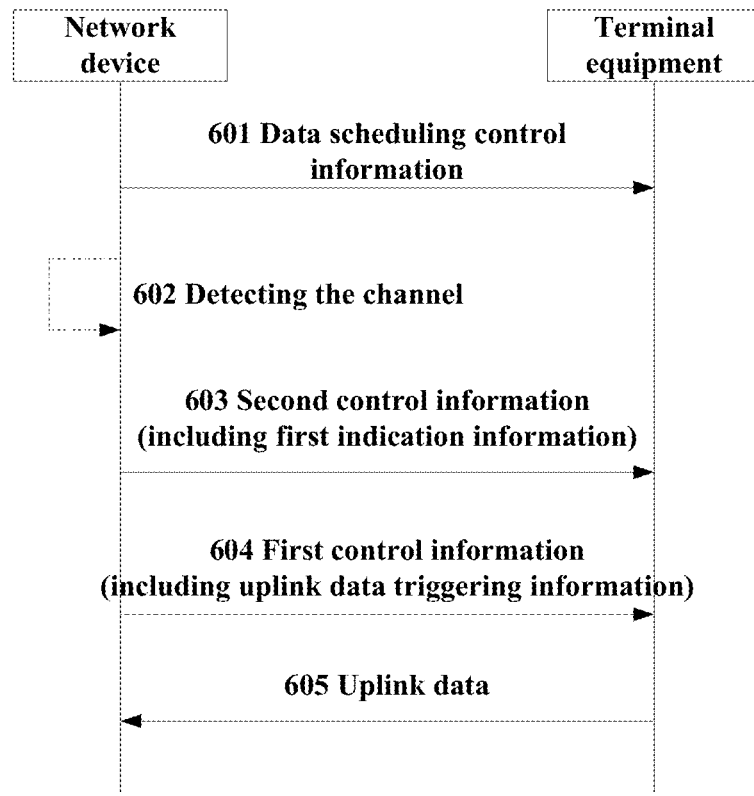
FIG. 6 is another schematic diagram of a method for data transmission and reception of the embodiment of this disclosure.

FIG. 6 is another schematic diagram of a method for data transmission and reception of the embodiment of this disclosure. As shown in FIG. 6, the method for data transmission and reception includes:

step 601: the network device transmits the data scheduling control information to the terminal equipment, the data scheduling control information being used to indicate the terminal equipment related information for transmitting an uplink data;

step 602: the network device detects the channel of the unlicensed frequency band to determine the one or more frequency domain bandwidth resources;

step 603: the network device transmits the second control information to the terminal equipment, the second control information including the first indication information indicating the one or more frequency domain bandwidth resources;

step 604: the network device transmits the first control information including uplink data triggering information to the terminal equipment; and step 605: the terminal equipment transmits the uplink data to the network device on the available time-frequency resources in the bandwidths where the available time-frequency resources indicated by the data scheduling control information and the one or more frequency domain bandwidth resources indicated by the first indication information coincide.

It should be noted that FIG. 6 only schematically illustrate the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 6.

In an embodiment, the first indication information and the data scheduling control information may be transmitted within the same channel occupancy time.

Figure 7:
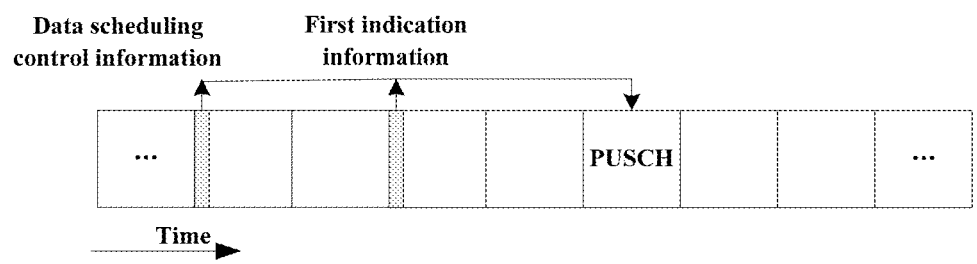
FIG. 7 is a schematic diagram of first indication information and data scheduling control information of an embodiment of this disclosure.

FIG. 7 is a schematic diagram of the first indication information and data scheduling control information of the embodiment of this disclosure. As shown in FIG. 7, after receiving the data scheduling control information, the terminal equipment needs to wait for the first indication information, and after receiving the first indication information, it transmits the uplink data according to contents indicated by the two pieces of information.

For example, the terminal equipment may share the channel occupancy time (COT) of the network device to transmit data, and the network device notifies the terminal equipment of a size of a bandwidth that may be shared. For example, the network device detects an idle state of the channel before transmitting the data scheduling control information, obtains a size of an idle bandwidth according to a detection result, and transmits the data scheduling control information on idle frequency domain bandwidth resources. However, as the data scheduling control information has been packaged and encoded and needs to be transmitted immediately, bandwidth information is unable to be carried in the information to notify the terminal equipment of the size of the bandwidth that may be shared. Therefore, the terminal equipment needs to wait for the first indication information, so as to determine a size of a bandwidth capable of transmitting data and then transmits the uplink data.

In an embodiment, the first indication information and the data scheduling control information may be transmitted at different channel occupancy times. For example, it may be applicable to a case where network device schedules terminal equipment in a cross-COT manner.

Figure 8:
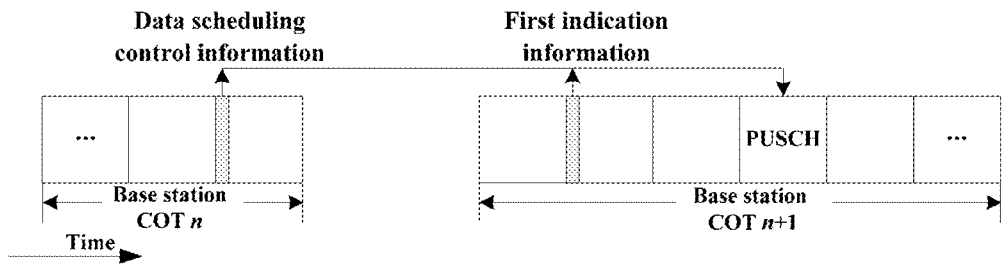
FIG. 8 is another schematic diagram of the first indication information and data scheduling control information of the embodiment of this disclosure.

FIG. 8 is another schematic diagram of the first indication information and data scheduling control information of the embodiment of this disclosure. As shown in FIG. 8, for example, at a last COT, the network device transmits the data scheduling control information to the terminal equipment, and after the network device obtains a new COT, it may inform the terminal equipment of a bandwidth that may be shared with it. Hence, uplink scheduling may be performed quickly in the new COT, and it may be avoided that a part of former symbols of the new COT cannot be scheduled to transmit the uplink data due to restriction of uplink scheduling timing.

It should be noted that the channel occupancy time (COT) of the unlicensed frequency band of the network device is only a reference for a timing relationship. Transmission of the data scheduling control information and bandwidth indication on the unlicensed frequency bands is not limited in the embodiment of this disclosure, and the transmission may be performed on licensed frequency bands.

In an embodiment, the first indication information is transmitted before the data scheduling control information. For example, after receiving the data scheduling control information, the terminal equipment may determine whether there exists valid first indication information, and if there exists valid first indication information, it transmits the uplink data on the available time-frequency resources in the bandwidths where the available time-frequency resources indicated by the data scheduling control information and the one or more frequency domain bandwidth resources indicated by the first indication information coincide.

In an embodiment, there exists no specific timing relationship between times of transmission of the first indication information and the data scheduling control information, that is, the first indication information may be transmitted before the data scheduling control information, or may be transmitted after the data scheduling control information.

Figure 9:
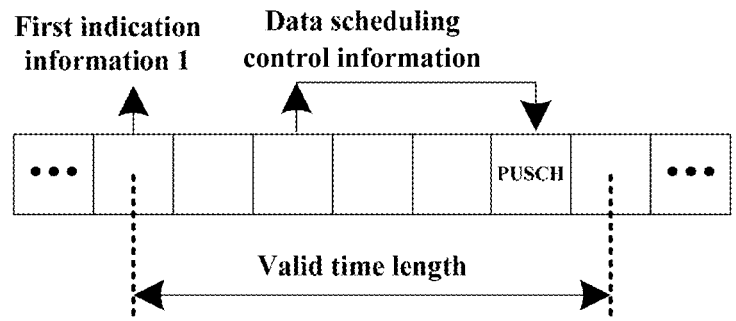
FIG. 9 is a further schematic diagram of the first indication information and data scheduling control information of the embodiment of this disclosure.

FIG. 9 is a further schematic diagram of the first indication information and data scheduling control information of the embodiment of this disclosure. As shown in FIG. 9, for example, after receiving a piece of data scheduling control information, the terminal equipment may determine whether there exists valid first indication information. If there exists valid first indication information (first indication information 1 is valid) and a time instant of transmitting the uplink data is still within an effective time length of the first indication information, the terminal equipment transmits the uplink data according to contents indicated by the data scheduling control information and the first indication information.

Figure 10:
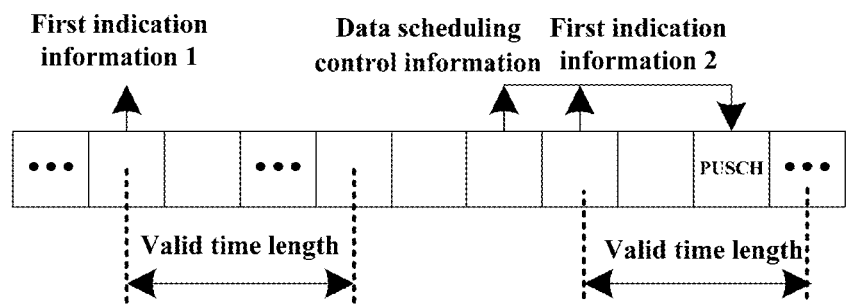
FIG. 10 is yet another schematic diagram of the first indication information and data scheduling control information of the embodiment of this disclosure.

FIG. 10 is yet another schematic diagram of the first indication information and data scheduling control information of the embodiment of this disclosure. As shown in FIG. 10, for example, after the terminal equipment receives a piece of data scheduling control information, if there exists no valid first indication information (first indication information is not received or first indication information 1 fails), the terminal equipment waits for control information carrying the first indication information, and after the terminal equipment receives the control information (first indication information 2), it may transmit the uplink data according to contents indicated by the data scheduling control information and the first indication information.

The valid first indication information may be first indication information received last time, the indication being information possibly used to inform the terminal equipment of a size of a bandwidth that may be used for data transmission, or being information on a size of a bandwidth of successful downlink transmission by the terminal equipment instructed by the network device last time. A manner for the network device to notify the effective time length of the transmission bandwidth may be that a separate indication field notifies in the control information notifying the first indication information, or an indication field indicates contents and the effective time length of the first indication information jointly in the control information, or information on the channel occupancy time of the network device may implicitly indicate the effective time length; and there may also exist a default effective time length, which will be invalid if the time length is exceeded.

The transmission of the first indication information is schematically described above, and the uplink data shall be described below.

In an embodiment, the network device receives the uplink data on the available time-frequency resources in the bandwidths where the one or more frequency domain bandwidth resources indicated by the first indication information and the available time-frequency resources indicated by the data scheduling control information coincide.

Figure 11:
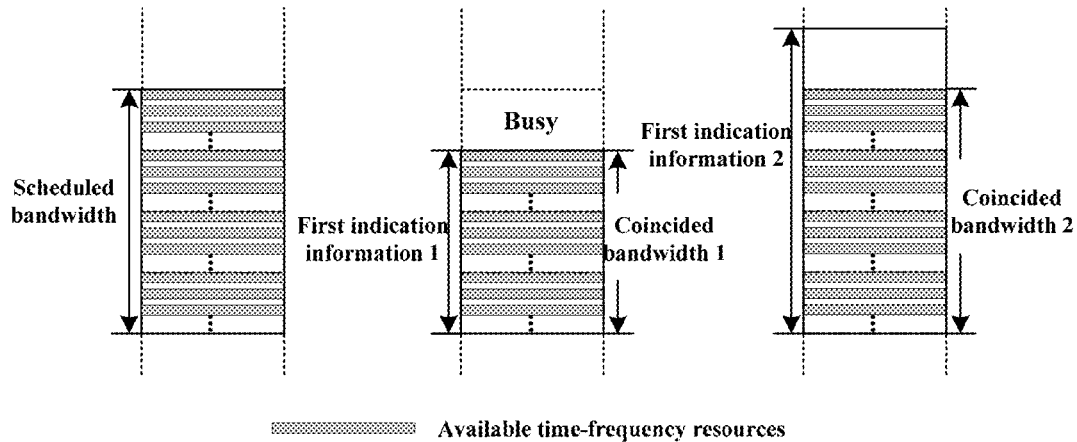
FIG. 11 is a schematic diagram of a part of bandwidth resources transmitting uplink data of an embodiment of this disclosure.

FIG. 11 is a schematic diagram of a part of bandwidth resources transmitting the uplink data of the embodiment of this disclosure, in which the data scheduling control information may indicate available time-frequency resources in the scheduled bandwidth resources that may be used to transmit the uplink data. As shown in FIG. 11, after receiving the first indication information, the terminal equipment transmits the uplink data on the available time-frequency resources in the bandwidths where the available time-frequency resources and the one or more frequency domain bandwidth resources indicated by the first indication information coincide.

For example, the frequency domain bandwidth resources indicated by the first indication information 1 are less than the scheduled bandwidth resources, and the coincided parts may be the frequency domain bandwidth resources indicated by the first indication information 1, as shown by coincided bandwidth 1 in FIG. 11. For another example, the frequency domain bandwidth resources indicated by the first indication information 2 are more than the scheduled bandwidth resources, and the coincided parts may be the frequency domain bandwidth resources included in the scheduled bandwidth, as shown by coincided bandwidth 2 in FIG. 11.

The data scheduling control information may further indicate the number of frequency domain bandwidth resources scheduled in the scheduling bandwidth, or the size and number of the scheduled frequency domain bandwidth resources. After receiving the first indication information, the terminal equipment may transmit on the frequency domain bandwidth resources indicated by the first indication information, and if the number of the scheduled frequency domain bandwidth resources is less than the number of frequency domain bandwidth resources included in the transmission bandwidth indicated by the first indication information, it may transmit on the default bandwidth according to a rule.

The uplink data may be transmitted on frequency domain bandwidth resources of a number identical to the number of frequency domain bandwidth resources scheduled before the transmission bandwidth indicated by the first indication information. For example, the data scheduling control information indicates that two frequency domain bandwidth resources are scheduled, but does not indicate a starting position, or an ending position, or a specific position, in the bandwidth, the terminal equipment may determine a transmission block size (TBS), perform encoding and rate matching, etc., according to sizes of the two frequency domain bandwidth resources, and after receiving the first indication information, determine that the transmission bandwidth size is of 4 frequency domain bandwidth resources and their frequency domain positions, then, the data of the two scheduled frequency domain bandwidth resources will be transmitted on former two frequency domain bandwidth resources in the transmission bandwidth; or it may be specified that the number of the frequency domain bandwidth resources indicated by the first indication information is not greater than the number of the scheduled frequency domain bandwidth resources, and if the number of the scheduled frequency domain bandwidth resources is greater than the number of frequency domain bandwidth resources included in the indicated transmission bandwidth, the uplink data are transmitted only on the indicated transmission bandwidth.

In an embodiment, the scheduled bandwidth resources may be of default sizes; or the scheduled bandwidth may be notified by the network device to the terminal equipment in at least one of the following manners: indicating the scheduled bandwidth resources by the data scheduling control information, configuring the scheduled bandwidth resources via high-layer signaling, and configuring the scheduled bandwidth resources via system information.

In an embodiment, the first control information is user-specific control information or common control information, and the first control information further includes second indication information used for indicating uplink and downlink structures. The first control information may further include information indicating a valid time length of the first indication information, or the second indication information may further be used to indicate a valid time length of the first indication information.

For example, the second indication information of the uplink and downlink structures may implicitly indicate that: the first indication information is valid within uplink and downlink durations indicated by the first control information; or, a field in the second control information indicates a valid time length, an indicated content being an index value of one of candidate valid time lengths. If it is common control information, it may be a slot format indication scrambled by SFI-RNTI in NR, or it may also be common control information scrambled by a new scrambling code sequence.

In an embodiment, a unit/units of the effective time length and/or the uplink and downlink structure indication information may be at least one of a symbol, a slot, a subframe, and a millisecond; however, this disclosure is not limited thereto.

In an embodiment, if the transmission time instant of the above uplink data is within a valid time length of a piece of the first indication information, the network device receives the uplink data at the transmission time instant; if the transmission time instant of the uplink data is not within the valid time length of a piece of the first indication information, the network device receives the uplink data after transmitting a next piece of first indication information.

For example, the data scheduling control information may include related information indicating the transmission time instant (such as time domain resource allocation indication information, indication information of a relative symbol number interval and slot interval between the transmission time instant and the data scheduling control information, absolute time information of the transmission time instant, or relative time information of the transmission time instant with respect to a reference time, etc.); however, it is not limited thereto.

In an embodiment, the first indication information are transmitted on at least one of the following resources: a set of frequency domain resources of the one or more frequency domain bandwidth resources, a frequency domain bandwidth resource in the one or more frequency domain bandwidth resources, each frequency domain resource of the one or more frequency domain bandwidth resources, a resource of a licensed frequency band pre-allocated by the network device.

In an embodiment, the first indication information may be information explicitly indicating the frequency domain bandwidth resources for transmitting uplink data, and the terminal device obtains the frequency domain bandwidth resources for transmitting the uplink data after reading contents of the indication information.

For example, the first indication information is a bitmap, the number of bits of the bitmap being equal to the number of the frequency domain bandwidth resources included in the scheduled bandwidth resource, and one bit correspondingly indicating a frequency domain bandwidth resource. Setting a bit to be "1" indicates that a frequency domain bandwidth resource corresponding to the bit may transmit uplink data, and setting a bit to be "0" indicates that the frequency domain bandwidth resource corresponding to the bit may not be used to transmit uplink data; or, setting a bit to be "0" indicates that a frequency domain bandwidth resource corresponding to the bit may transmit uplink data, and setting a bit to be "1" indicates that the frequency domain bandwidth resource corresponding to the bit may not be used to transmit uplink data. However, this disclosure is not limited thereto, and, for example, two or more bits may indicate one frequency domain bandwidth resource.

For another example, the first indication information may indicate a resource indication value (RIV), that is, in a triangular binary tree coding manner, the resource indication value determines a starting frequency domain bandwidth resource and the number of frequency domain bandwidth resources of the bandwidth resource for transmitting the uplink data in the scheduled bandwidth resources.

The above implementations only illustrate the embodiment of this disclosure. However, this disclosure is not limited thereto, and appropriate variants may be made on the basis of these implementation. For example, the above implementations may be executed separately, or one or more of them may be executed in a combined manner.

It can be seen from the above embodiments that the network device transmits first indication information used for indicating one or more frequency-domain bandwidth resources to the terminal equipment. Hence, the network device and the terminal equipment may make an agreement on actually used frequency domain bandwidth resources, efficiency of utilization of spectral resources may be improved, transmission latency may be reduced, and flexibility of scheduling may be ensured.

Embodiment 2

Figure 12:
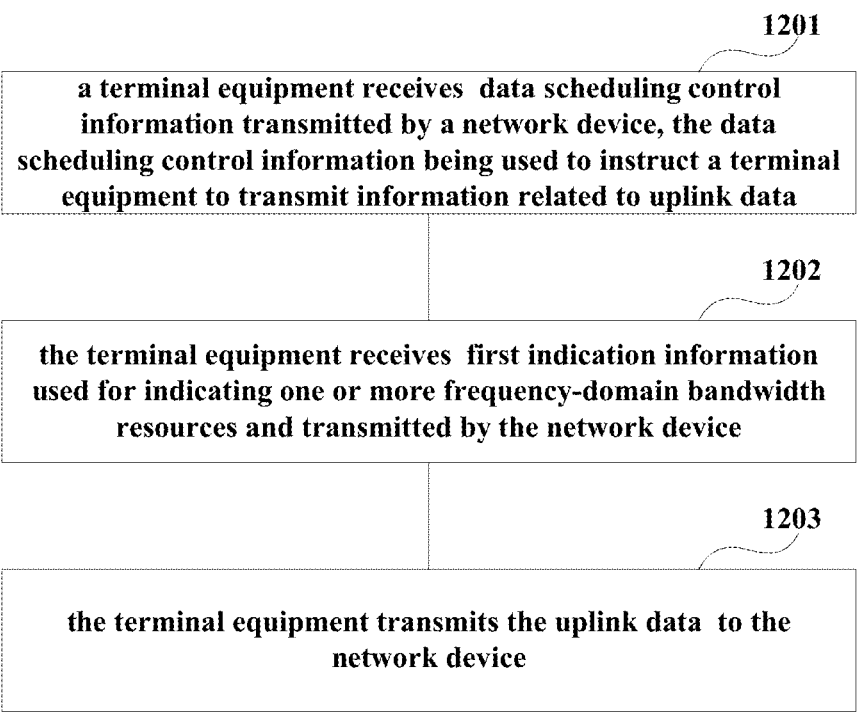
FIG. 12 is a schematic diagram of a method for data transmission of an embodiment of this disclosure.

The embodiments of this disclosure provide a method for data transmission, with contents identical to those in Embodiment 1 being not going to be described herein any further. FIG. 12 is a schematic diagram of a method for data transmission of the embodiment of this disclosure, in which a case at a terminal equipment side is shown. As shown in FIG. 12, the method includes:

step 1201: a terminal equipment receives data scheduling control information transmitted by a network device, the data scheduling control information being used to indicate a terminal equipment related information for transmitting an uplink data;

step 1202: the terminal equipment receives first indication information used for indicating one or more frequency-domain bandwidth resources and transmitted by the network device; and step 1203: the terminal equipment transmits the uplink data to the network device.

It should be noted that FIG. 12 only schematically illustrate the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 12.

In an embodiment, the frequency domain bandwidth resources are frequency domain resources having certain frequency band bandwidths.

In an embodiment, the terminal equipment transmits the uplink data on an unlicensed frequency band, and the terminal equipment receives the first indication information and/or the data scheduling control information on the unlicensed frequency band or a licensed frequency band.

In an embodiment, the first indication information may further be used to indicate at least one of the following: a bandwidth resource for the terminal equipment to transmit uplink data, a bandwidth resource for the network device to transmit downlink data, and a bandwidth resource for the terminal equipment to share a channel occupancy time of the network device to transmit uplink data.

In an embodiment, the terminal equipment receives first control information including uplink data triggering information transmitted by the network device, and the terminal equipment receives the first control information before transmitting the uplink data; the uplink data triggering information is used to trigger the terminal equipment to transmit the uplink data.

In an embodiment, the terminal equipment receives the first indication information after the data scheduling control information.

In an embodiment, the terminal equipment receives the first indication information before the data scheduling control information.

In an embodiment, the first indication information and the data scheduling control information are received within the same channel occupancy time.

In an embodiment, the first indication information and the data scheduling control information are received in different channel occupancy times.

In an embodiment, the first indication information is included in the first control information carrying the uplink data triggering information, the uplink triggering information being used to trigger the terminal equipment to transmit the uplink data.

In an embodiment, the first indication information is included in second control information different from the first control information.

In an embodiment, the data scheduling control information may further be used to indicate available time-frequency resources that may be used by the terminal equipment to transmit the uplink data on the scheduled bandwidth resources.

In an embodiment, the terminal equipment transmits the uplink data on available time-frequency resources in bandwidths where the one or more frequency domain bandwidth resources indicated by the first indication information and the available time-frequency resources indicated by the data scheduling control information coincide.

In an embodiment, the scheduled bandwidth resources may be of default sizes; or the scheduled bandwidth may be notified by the network device to the terminal equipment in at least one of the following manners: indicating the scheduled bandwidth resources by the data scheduling control information, configuring the scheduled bandwidth resources via high-layer signaling, and configuring the scheduled bandwidth resources via system information.

In an embodiment, the first control information is user-specific control information or common control information, and the uplink data triggering information further includes second indication information used for indicating uplink and downlink structures.

In an embodiment, the first control information may further include information indicating a valid time length of the first indication information, or the second indication information may further be used to indicate a valid time length of the first indication information.

In an embodiment, a unit/units of the effective time length and/or the second indication information indicating uplink and downlink structures may be at least one of a symbol, a slot, a subframe, and a millisecond.

In an embodiment, if the transmission time instant of the uplink data is within a valid time length of a piece of the first indication information, the terminal equipment transmits the uplink data at the transmission time instant; if the transmission time instant of the uplink data is not within the valid time length of a piece of the first indication information, the terminal equipment transmits the uplink data after receiving a next piece of first indication information.

In an embodiment, the data scheduling control information includes related information indicating the transmission time instant.

In an embodiment, the terminal equipment receives the first indication information on at least one of the following resources: frequency domain resources of the scheduled bandwidth, a frequency domain bandwidth resource in the scheduled bandwidth, each frequency domain resource of the scheduled bandwidth, and a resource pre-allocated by the network device.

The above implementations only illustrate the embodiment of this disclosure. However, this disclosure is not limited thereto, and appropriate variants may be made on the basis of these implementation. For example, the above implementations may be executed separately, or one or more of them may be executed in a combined manner.

It can be seen from the above embodiments that the network device transmits first indication information used for indicating one or more frequency-domain bandwidth resources to the terminal equipment. Hence, the network device and the terminal equipment may make an agreement on actually used frequency domain bandwidth resources, efficiency of utilization of spectral resources may be improved, transmission latency may be reduced, and flexibility of scheduling may be ensured.

Embodiment 3

The embodiments of this disclosure provide a method for data reception, which is described from a network device side. The embodiments in Embodiment 3 and Embodiment 4 may be referred to as non-triggering scheduling modes.

Figure 13:
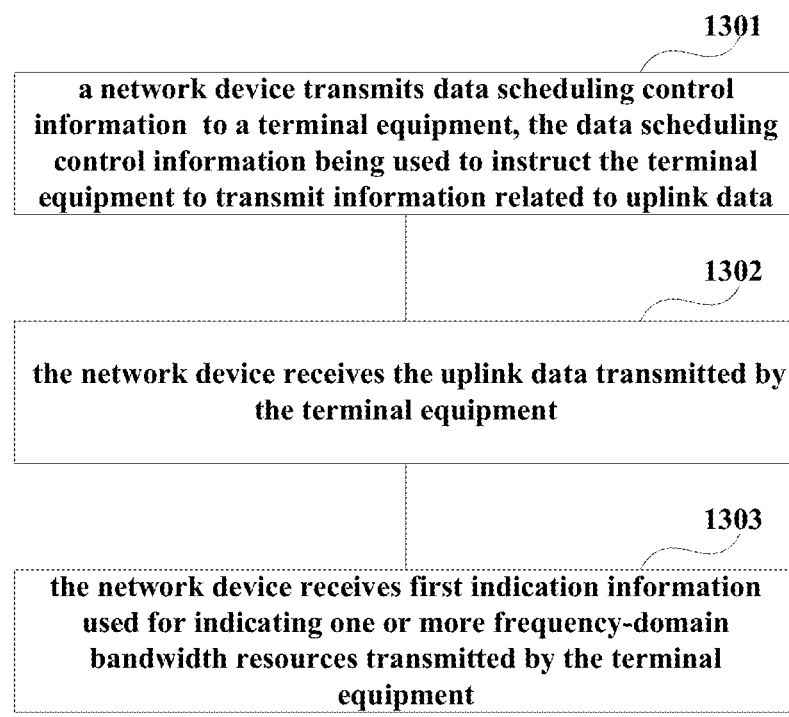
FIG. 13 is a schematic diagram of a method for data reception of an embodiment of this disclosure.

FIG. 13 is a schematic diagram of a method for data reception of the embodiment of this disclosure. As shown in FIG. 13, the method for data reception includes:

step 1301: a network device transmits data scheduling control information to a terminal equipment, the data scheduling control information being used to indicate the terminal equipment related information for transmitting an uplink data;

step 1302: the network device receives the uplink data transmitted by the terminal equipment; and step 1303: the network device receives first indication information used for indicating one or more frequency-domain bandwidth resources transmitted by the terminal equipment.

In an embodiment, the network device receives the uplink data on an unlicensed frequency band, and the network device receives the first indication information and/or transmits the data scheduling control information on an unlicensed frequency band or a licensed frequency band.

For example, the network device may buffer the uplink data received in step 1302, and after receiving the first indication information in step 1303, process the uplink data in the buffer, so that the uplink data may be obtained correctly.

In an embodiment, the network device may instruct the terminal equipment to detect the frequency domain bandwidth resources in the scheduled bandwidth resources, and the terminal equipment determines the one or more frequency domain bandwidth resources according to a result of detection of the scheduled bandwidth resources.

Figure 14:
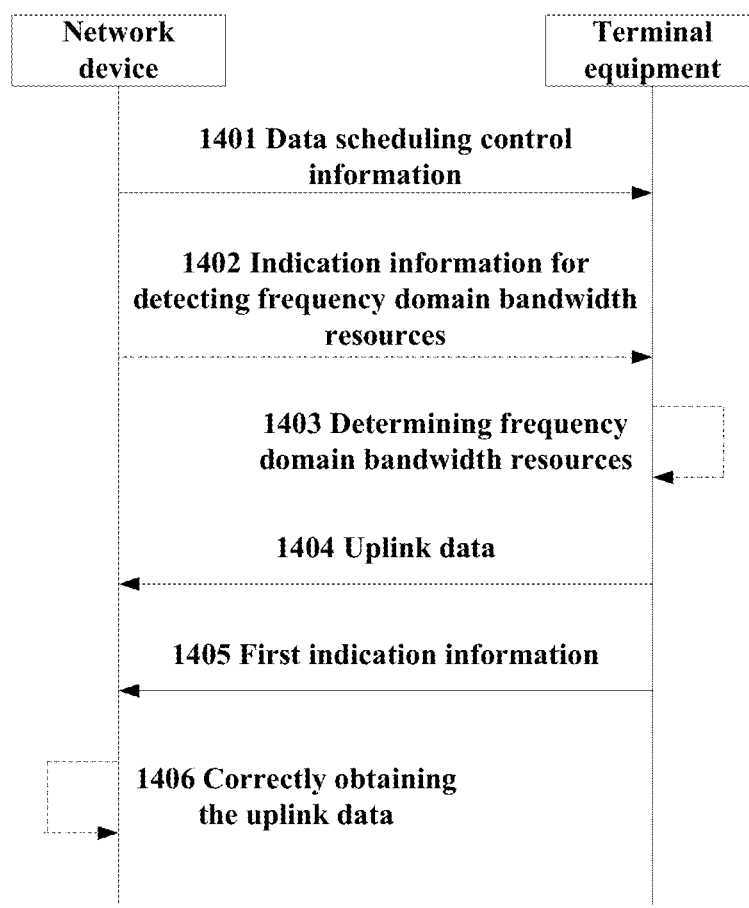
FIG. 14 is a schematic diagram of a method for data transmission and reception of an embodiment of this disclosure.

FIG. 14 is a schematic diagram of a method for data transmission and reception of the embodiment of this disclosure. As shown in FIG. 14, the method for data reception includes:

step 1401: the network device transmits data scheduling control information to the terminal equipment, the data scheduling control information being used to indicate the terminal equipment related information for transmitting an uplink data;

step 1402: the network device instructs the terminal equipment to detect frequency domain bandwidth resources in the scheduled bandwidth;

step 1403: the terminal equipment determines one or more frequency domain bandwidth resources according to a result of detection of the scheduled bandwidth;

step 1404: the terminal equipment transmits uplink data to the network device according to contents indicated by the data scheduling control information;

step 1405: the terminal equipment transmits first indication information used for indicating the one or more frequency-domain bandwidth resources to the network device; and step 1406: the network device correctly obtains the uplink data after receiving the first indication information.

It should be noted that FIG. 14 only schematically illustrate the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 14.

When the terminal equipment needs to detect idle states of multiple frequency domain bandwidth resources in the scheduled bandwidth resource and then performs data transmission, the terminal equipment transmits the uplink data on frequency domain bandwidth resources detected as being idle, may transmit the first indication information after the transmission is completed, and notifies the network device of frequency domain bandwidth resources having transmitted data, i.e. channel bandwidth resources detected by the terminal equipment as being idle and occupied by the terminal equipment.

In an embodiment, the first indication information may be transmitted on a resource pre-allocated by the network device.

For example, the network device allocates resources of the first indication information on each frequency domain bandwidth unit in the scheduled bandwidth resource, and the first indication information may be transmitted repeatedly on the pre-allocated resource of each frequency domain bandwidth resource detected as being an idle state, or, the first indication information is transmitted on a resource set consisting of pre-allocated resources of frequency domain bandwidth resources detected as being in an idle state, that is, it is transmitted on pre-allocated resources in the frequency domain bandwidth resources having transmitted the uplink data.

In an embodiment, the first indication information may be transmitted on a frequency domain bandwidth resource detected as being in an idle state and obtained according to a rule.

For example, the first indication information is transmitted on a first or a last frequency domain bandwidth resource in the bandwidth unit detected as being in an idle state. If the scheduled bandwidth resource contains 4 bandwidth units, and the terminal equipment detects that a first bandwidth unit is in a busy state and a second, third and fourth bandwidth units are in an idle state, the first indication information is transmitted on the second bandwidth unit, and after detecting the first indication information on the bandwidth unit, the network device determines that a starting position of the transmission bandwidth is at the second bandwidth unit, and further determines its correctness and a width of the transmission bandwidth according to contents of the first indication information.

In an embodiment, the first indication information may be indication information, and the network device obtains the frequency domain bandwidth resources having transmitting the uplink data after reading contents of the indication information.

For example, the first indication information is a bitmap, the number of bits of the bitmap being equal to the number of the frequency domain bandwidth resources included in the scheduled bandwidth resource, and one bit correspondingly indicating a frequency domain bandwidth resource. Setting a bit to be "1" indicates that a frequency domain bandwidth resource corresponding to the bit has transmitted uplink data, and setting a bit to be "0" indicates that the frequency domain bandwidth resource corresponding to the bit has not transmitted uplink data; or, setting a bit to be "0" indicates that a frequency domain bandwidth resource corresponding to the bit has transmitted uplink data, and setting a bit to be "1" indicates that the frequency domain bandwidth resource corresponding to the bit has transmitted uplink data. However, this disclosure is not limited thereto, and, for example, two or more bits may indicate one frequency domain bandwidth resource.

For another example, the first indication information may indicate a resource indication value (RIV), that is, in a triangular binary tree coding manner, the resource indication value determines a starting frequency domain bandwidth resource and the number of frequency domain bandwidth resources of the bandwidth resource for transmitting the uplink data in the scheduled bandwidth resources.

In an embodiment, the first indication information may also be a segment of default sequence symbols.

For example, the terminal equipment transmits the default sequence symbols on the bandwidth unit that has transmitted data, and the network device detects the default sequence symbols on each bandwidth unit and deems that the bandwidth unit where the default sequence symbols are detected transmits the uplink data. The default sequence may be SRSs (sounding reference signals), or may be other sequence symbols. The network device may detect the default sequence symbols via correlation of the sequence; however, it is not limited thereto.

In an embodiment, the pre-allocated resources may be resources on a licensed frequency band connected to the terminal equipment, and the terminal equipment transmits the first indication information on corresponding resources of the licensed frequency band after data transmission is completed. Feedback of the first indication information on an uplink resource in the licensed frequency band may be configured by the network device to the terminal equipment via high-layer signaling.

For example, information on configuration of the frequency domain bandwidth resources by the network device for the terminal equipment includes feedback bandwidth resource indication configuration information or feedback carrier indication configuration information, which is used for configuring a licensed frequency band or a licensed frequency band carrier for feeding back the first indication information. The configuration information may be optional, and when the bandwidth resource does not include multiple bandwidth units, or when the bandwidth does not need to feed back the first indication information, the information may not be configured.

In an embodiment, the pre-allocated resources may be a part of PUSCH or PUCCH resources, or other resources.

In an embodiment, the first indication information may further be used to indicate that the network device may share a channel occupancy time (COT) of the terminal equipment for transmitting the first indication information, that is, after receiving the indication, the network device may determine frequency domain bandwidth resources that may be shared, and in a case of detecting and/or not detecting that a channel is idle, downlink data are transmitted on the shared bandwidth unit within the channel occupancy time of the terminal equipment.

In an embodiment, the network device may determine a maximum channel occupancy time of the terminal equipment according to a channel access priority indication field in the data scheduling control information, and determine whether the channel occupancy time of the terminal equipment may be shared. A channel occupancy time length that may be shared by the network device may be indicated by a field in information carrying the first indication information transmitted by the terminal equipment, and an indication granularity of the field may be the number of symbols or the number of groups of symbols or the number of slots that can be occupied. It may also be indicated jointly with the first indication information, which indicates index values of multiple combinations of contents indicated by the first indication information and the channel occupancy time.

In an embodiment, the terminal equipment may also only detect an idle state of one frequency domain bandwidth resource in the scheduled bandwidth resources, and determine whether to transmit the uplink data on the entire scheduled bandwidth resource. If a detection result is that it is idle, the terminal equipment transmits the uplink data on the entire scheduled bandwidth resource; and if the detection result is that it is busy, the terminal equipment does not transmit the uplink data. In this case, as the terminal equipment does not transmit the uplink data on part of the scheduled bandwidth resources, when the terminal equipment only detects an idle state of one frequency domain bandwidth resource, the first indication information is not fed back.

The one frequency domain bandwidth resource may be the scheduling bandwidth resource itself, or may be one of multiple frequency domain bandwidth resources in the scheduled bandwidth resource, and the network device instructs the terminal equipment to detect one of the frequency domain bandwidth resources, hence, whether data of all bandwidth units in the entire scheduled bandwidth are transmitted is determined by a result of detection of the frequency domain bandwidth resource.

For example, a frequency domain bandwidth resource needing to be detected may be a default bandwidth unit, or a first or a last frequency domain bandwidth resource in the scheduled bandwidth of the network device, or a bandwidth at a middle position, such as an [N/Z]-th or an [N/2]-th bandwidth unit.

For example, a frequency domain bandwidth resource needing to be detected may be notified to the terminal equipment by a field in the data scheduling control information that a frequency domain bandwidth resource needing to be detected with respect to an idle state at this time of scheduling, or may be indicated jointly with other information.

For another example, a frequency domain bandwidth resource needing to be detected may also be indicated by the network device to the terminal equipment via signaling, the signaling indicating the frequency domain bandwidth resource being high-layer configuration signaling.

In an embodiment, the configuration information of the frequency domain bandwidth resource may include detecting idle state configuration information, indicating whether the terminal equipment detects an idle state of a channel in the frequency domain bandwidth resource; or the bandwidth configuration information may include detecting idle state frequency domain bandwidth resource indication configuration information, indicating an index/indices of one or more frequency domain bandwidth resources in the bandwidth, and showing a frequency domain bandwidth resource needing to detected with respect to an idle state of a channel.

The above implementations only illustrate the embodiment of this disclosure. However, this disclosure is not limited thereto, and appropriate variants may be made on the basis of these implementation. For example, the above implementations may be executed separately, or one or more of them may be executed in a combined manner.

It can be seen from the above embodiments that the terminal equipment transmits first indication information used for indicating one or more frequency-domain bandwidth resources to the network device. Hence, the network device and the terminal equipment may make an agreement on actually used frequency domain bandwidth resources, efficiency of utilization of spectral resources may be improved, transmission latency may be reduced, and flexibility of scheduling may be ensured.

Embodiment 4

Figure 15:
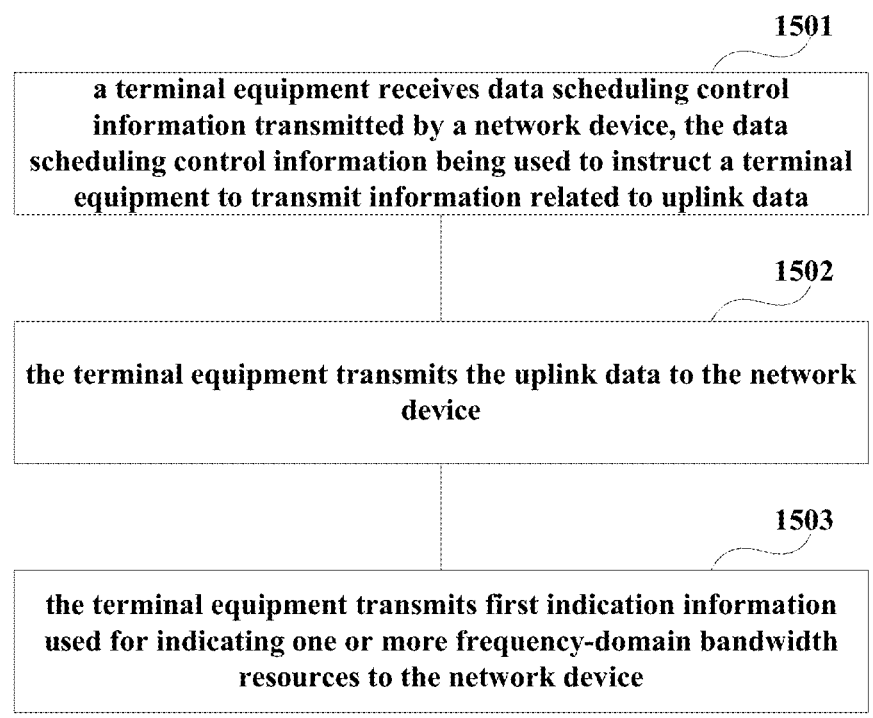
FIG. 15 is a schematic diagram of a method for data transmission method of an embodiment of this disclosure.

The embodiments of this disclosure provide a method for data transmission, with contents identical to those in Embodiment 3 being not going to be described herein any further. FIG. 15 is a schematic diagram of a method for data transmission of the embodiment of this disclosure, in which a case at a terminal equipment side is shown. As shown in FIG. 15, the method includes:

step 1501: a terminal equipment receives data scheduling control information transmitted by a network device, the data scheduling control information being used to indicate a terminal equipment related information for transmitting an uplink data;

step 1502: the terminal equipment transmits the uplink data to the network device; and step 1503: the terminal equipment transmits first indication information used for indicating one or more frequency-domain bandwidth resources to the network device.

In an embodiment, the terminal equipment transmits the uplink data on an unlicensed frequency band, and the terminal equipment transmits the first indication information and/or receives the data scheduling control information on an unlicensed frequency band or a licensed frequency band.

In an embodiment, the terminal equipment detects the frequency domain bandwidth resources in the scheduled bandwidth according to an instruction of the network device, and the terminal equipment determines the one or more frequency domain bandwidth resources according to a result of detection of one or more bandwidths.

In an embodiment, the scheduled bandwidth may be an unlicensed frequency band resource.

In an embodiment, the scheduled bandwidth resource is of a default size, or the scheduled bandwidth resource is notified to the terminal equipment by the network device in at least one of the following manners: indicating the scheduled bandwidth resource by the data scheduling control information; configuring the scheduled bandwidth resource via higher layer signaling; and configuring the scheduled bandwidth resource via system information.

In an embodiment, the first indication information is further used to indicate as least one of the following: a bandwidth resource where the terminal equipment transmits the uplink data, a bandwidth resource where the network device is allowed to transmit downlink data, and a bandwidth resource where the network device is allowed to share a channel occupancy time of the terminal equipment to transmit downlink data.

In an embodiment, the first indication information is transmitted by the terminal equipment after the uplink data.

In an embodiment, the terminal equipment transmits the first indication information on the frequency-domain resources which have transmitted the uplink data, or transmits the first indication information on one of one or more frequency-domain resources which have transmitted the uplink data, or transmits the first indication information on each frequency-domain resource which has transmitted the uplink data, or transmits the first indication information on a resource pre-allocated by the network device.

The above implementations only illustrate the embodiment of this disclosure. However, this disclosure is not limited thereto, and appropriate variants may be made on the basis of these implementation. For example, the above implementations may be executed separately, or one or more of them may be executed in a combined manner.

It can be seen from the above embodiments that the terminal equipment transmits first indication information used for indicating one or more frequency-domain bandwidth resources to the network device. Hence, the network device and the terminal equipment may make an agreement on actually used frequency domain bandwidth resources, efficiency of utilization of spectral resources may be improved, transmission latency may be reduced, and flexibility of scheduling may be ensured.

Embodiment 5

The embodiments shall be described on the basis of embodiments 1-4.

In an embodiment, the system may separately adopt one of the above triggering scheduling mode and non-triggering scheduling mode, and may also support both of the above scheduling modes at the same time. For example, a terminal equipment may be notified via high-layer configuration signaling to adopt one of the scheduling modes.

In an embodiment, the network device transmits scheduling mode information to the terminal equipment; the scheduling mode information instructs the terminal equipment to transmit the uplink data by using uplink data triggering information (triggering scheduling mode), or instructs the terminal equipment to transmit the uplink data by not using uplink data triggering information (non-triggering scheduling mode).

For example, a field in the data scheduling control information notifies whether this time of scheduling is triggering scheduling or non-triggering scheduling. It may be indicated in an indication field by a 1-bit scheduling mode: "0" denotes non-triggering scheduling, in which after receiving the indication field, the terminal equipment transmits the uplink data according to the scheduling indication, and after transmitting the data, determines whether to transmit first indication information to the network device according to the number of frequency bandwidth resources needing to be detected; and "1" denotes triggering scheduling, in which after receiving the indication field, the terminal equipment transmits the uplink data according to valid first indication information. In the scheduling modes, it may also be that "1" denotes non-triggering scheduling, and "0" denotes triggering scheduling.

In another embodiment, the network device transmits channel access mode indication information of an unlicensed frequency band to the terminal equipment; the channel access mode indication information of the unlicensed frequency band indicates that the terminal equipment determines to transmit the uplink data by using the uplink data triggering information (triggering scheduling mode), or indicates that the terminal equipment determines to transmit the uplink data by not using the uplink data triggering information (non-triggering scheduling mode).

For example, a channel access state implicitly indicates a scheduling mode. When it is indicated that channel access type is complete LBT containing contention window, which is similar to LTE channel access type 1 this time of scheduling is implicitly indicated as non-triggering scheduling; when the indicated channel access type is similar to LTE channel access type 2, an idle state of a channel at a fixed time is only detected, and data are transmitted immediately if the channel is idle, or in a case where a transmission time interval is less than a default length and there is no need to detect a idle state of a channel, it is implicitly indicated that this time of scheduling is triggering scheduling.

Embodiment 6

The embodiments of this disclosure provide an apparatus for data reception. The apparatus may be, for example, a network device, and may also be one or more components or assemblies configured in a network device. And contents in the embodiments identical to those in embodiments 1 and 2 shall not be described herein any further.

Figure 16:
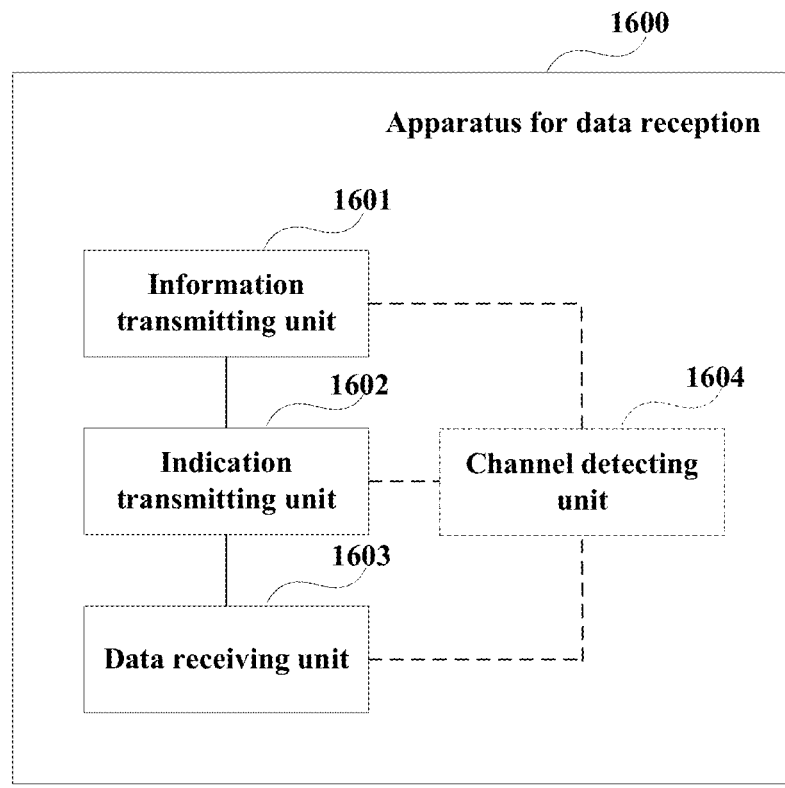
FIG. 16 is a schematic diagram of an apparatus for data reception apparatus of an embodiment of this disclosure.

FIG. 16 is a schematic diagram of an apparatus for data reception of the embodiment of this disclosure. As shown in FIG. 16, an apparatus for data reception 1600 includes:

an information transmitting unit 1601 configured to transmit data scheduling control information to a terminal equipment, the data scheduling control information being used to indicate the terminal equipment related information for transmitting an uplink data;

an indication transmitting unit 1602 configured to transmit first indication information used for indicating one or more frequency-domain bandwidth resources to the terminal equipment; and a data receiving unit 1603 configured to receive the uplink data transmitted by the terminal equipment.

In an embodiment, the data receiving unit 1603 may receive the uplink data on an unlicensed frequency band, and the indication transmitting unit 1602 transmits the first indication information on an unlicensed frequency band or a licensed frequency band, and/or the indication transmitting unit 1601 transmits the data scheduling control information on the unlicensed frequency band or the licensed frequency band.

In an embodiment, the data receiving unit 1603 receives the uplink data according to the data scheduling control information, or receives the uplink data according to the data scheduling control information and the first indication information.

As shown in FIG. 16, the apparatus for data reception 1600 may further include:

a channel detecting unit 1604 configured to detect a channel of an unlicensed frequency band to determine the one or more frequency-domain bandwidth resources; and the first indication information is further configured to indicate that the one or more frequency-domain bandwidth resources are at least one of the following: a bandwidth resource where the terminal equipment is allowed to transmit uplink data, a bandwidth resource where a network device transmits downlink data, and a bandwidth resource where the terminal equipment is allowed to share a channel occupancy time of the network device to transmit uplink data.

In an embodiment, the information transmitting unit 1601 may also transmit scheduling mode information to the terminal equipment; the scheduling mode information indicates that the terminal equipment transmits the uplink data by using or not using uplink data triggering information;

or, transmit channel access mode indication information of an unlicensed frequency band to the terminal equipment, the channel access mode indication information of the unlicensed frequency band indicating that the terminal equipment determines to transmit the uplink data by using or not using uplink data triggering information.

The embodiments of this disclosure further provide an apparatus for data transmission. The apparatus may be, for example, a terminal equipment, and may also be one or more components or assemblies configured in a terminal equipment.

Figure 17:
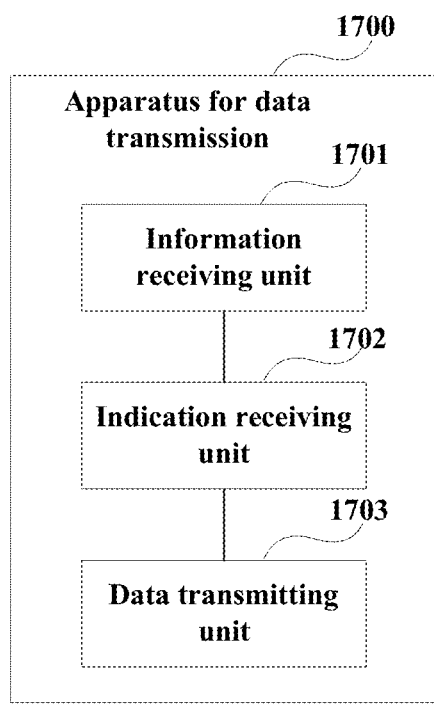
FIG. 17 is a schematic diagram of an apparatus for data transmission of an embodiment of this disclosure.

FIG. 17 is a schematic diagram of an apparatus for data transmission of the embodiment of this disclosure. As shown in FIG. 17, an apparatus for data transmission 1700 includes:

an information receiving unit 1701 configured to receive data scheduling control information transmitted by a network device;

an indication receiving unit 1702 configured to receive first indication information used for indicating one or more frequency-domain bandwidth resources and transmitted by the network device; and a data transmitting unit 1703 configured to transmit the uplink data to the network device.

In an embodiment, the information receiving unit 1701 may also receive scheduling mode information transmitted by the network device; the scheduling mode information indicates that the terminal equipment transmits the uplink data by using or not using uplink data triggering information;

or, receive channel access mode indication information of an unlicensed frequency band transmitted by the network device, the channel access mode indication information of the unlicensed frequency band indicating that the terminal equipment determines to transmit the uplink data by using or not using uplink data triggering information.

It should be noted that the components or modules related to this disclosure are only described above. However, this disclosure is not limited thereto, and the apparatus for data reception 1600 and the apparatus for data transmission 1700 may further include other components or modules, and reference may be made to related techniques for particulars of these components or modules.

Furthermore, for the sake of simplicity, connection relationships between the components or modules or signal profiles thereof are only illustrated in FIGS. 16 and 17. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the network device transmits first indication information used for indicating one or more frequency-domain bandwidth resources to the terminal equipment. Hence, the network device and the terminal equipment may make an agreement on actually used frequency domain bandwidth resources, efficiency of utilization of spectral resources may be improved, transmission latency may be reduced, and flexibility of scheduling may be ensured.

Embodiment 7

The embodiments of this disclosure provide an apparatus for data reception. The apparatus may be, for example, a network device, and may also be one or more components or assemblies configured in a network device. And contents in the embodiments identical to those in embodiments 3 and 4 shall not be described herein any further.

Figure 18:
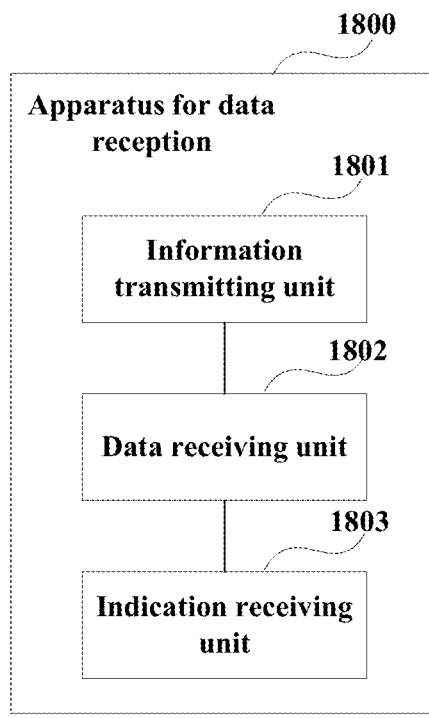
FIG. 18 is a schematic diagram of an apparatus for data reception of an embodiment of this disclosure.

FIG. 18 is a schematic diagram of an apparatus for data reception of the embodiment of this disclosure. As shown in FIG. 18, an apparatus for data reception 1800 includes:

an information transmitting unit 1801 configured to transmit data scheduling control information to a terminal equipment, the data scheduling control information being used to indicate the terminal equipment related information for transmitting an uplink data;

a data receiving unit 1802 configured to receive the uplink data transmitted by the terminal equipment; and an indication receiving unit 1803 configured to receive first indication information used for indicating one or more frequency-domain bandwidth resources and transmitted by the terminal equipment.

In an embodiment, the information transmitting unit 1801 may also transmit scheduling mode information to the terminal equipment; the scheduling mode information indicates that the terminal equipment transmits the uplink data by using or not using uplink data triggering information;

or, transmit channel access mode indication information of an unlicensed frequency band to the terminal equipment, the channel access mode indication information of the unlicensed frequency band indicating that the terminal equipment determines to transmit the uplink data by using or not using uplink data triggering information.

The embodiments of this disclosure further provide an apparatus for data transmission. The apparatus may be, for example, a terminal equipment, and may also be one or more components or assemblies configured in a terminal equipment.

Figure 19:
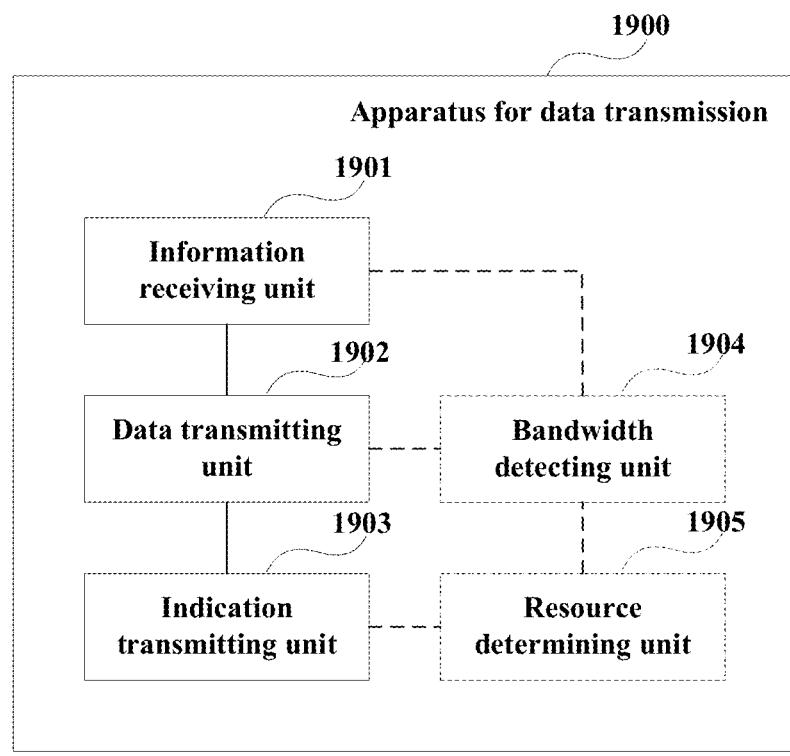
FIG. 19 is a schematic diagram of an apparatus for data transmission of an embodiment of this disclosure.

FIG. 19 is a schematic diagram of an apparatus for data transmission of the embodiment of this disclosure. As shown in FIG. 19, an apparatus for data transmission 1900 includes:

an information receiving unit 1901 configured to receive data scheduling control information transmitted by a network device, the data scheduling control information being used to indicate the terminal equipment related information for transmitting an uplink data;

a data transmitting unit 1902 configured to transmit the uplink data to the network device; and an indication transmitting unit 1903 configured to transmit first indication information used for indicating one or more frequency-domain bandwidth resources to the network device.

As shown in FIG. 19, the apparatus for data transmission 1900 may further include:

a bandwidth detecting unit 1904 configured to detect frequency-domain bandwidth resources in scheduled bandwidth resources according to indication of the network device; and a resource determining unit 1905 configured to determine the one or more frequency-domain bandwidth resources according to a result/results of detection of one or more bandwidths.

In an embodiment, the first indication information may further be used to indicate that the one or more frequency-domain bandwidth resources are at least one of the following: a bandwidth resource where the terminal equipment transmits the uplink data, a bandwidth resource where the network device is allowed to transmit downlink data, and a bandwidth resource where the network device is allowed to share a channel occupancy time of the terminal equipment to transmit downlink data.

In an embodiment, the indication transmitting unit 1903 transmits the first indication information on one or more frequency-domain resources which have transmitted the uplink data; or transmits the first indication information on one of one or more frequency-domain resources which have transmitted the uplink data; or transmits the first indication information on each frequency-domain resource which has transmitted the uplink data; or transmits the first indication information on a resource pre-allocated by the network device.

In an embodiment, the information receiving unit 1901 may further receive information on a scheduling mode transmitted by the network device, the information on a scheduling mode indicating that the terminal equipment transmits the uplink data by using or not using uplink data triggering information;

or, receive indication information on a channel access mode of an unlicensed frequency band transmitted by the network device, the indication information on a channel access mode of an unlicensed frequency band indicating that the terminal equipment determines to transmit the uplink data by using or not using uplink data triggering information.

It should be noted that the components or modules related to this disclosure are only described above. However, this disclosure is not limited thereto, and the apparatus for data reception 1800 and the apparatus for data transmission 1900 may further include other components or modules, and reference may be made to related techniques for particulars of these components or modules.

Furthermore, for the sake of simplicity, connection relationships between the components or modules or signal profiles thereof are only illustrated in FIGS. 18 and 19. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the network device transmits first indication information used for indicating one or more frequency-domain bandwidth resources to the terminal equipment. Hence, the network device and the terminal equipment may make an agreement on actually used frequency domain bandwidth resources, efficiency of utilization of spectral resources may be improved, transmission latency may be reduced, and flexibility of scheduling may be ensured.

Embodiment 8

The embodiments of this disclosure provide a communication system, and reference may be made to FIG. 1, with contents identical to those in embodiments 1-7 being not going to be described herein any further. In an embodiment, a communication system 100 may include:

a network device 101 configured with the apparatus for data reception 1600 as described in Embodiment 6 or the apparatus for data reception 1800 as described in Embodiment 7; and a terminal equipment 102 configured with the apparatus for data transmission 1700 as described in Embodiment 6 or the apparatus for data transmission 1900 as described in Embodiment 7.

The embodiments further provide a network device, which may be, for example, a base station. However, this disclosure is not limited thereto, and it may also be another network device.

Figure 20:
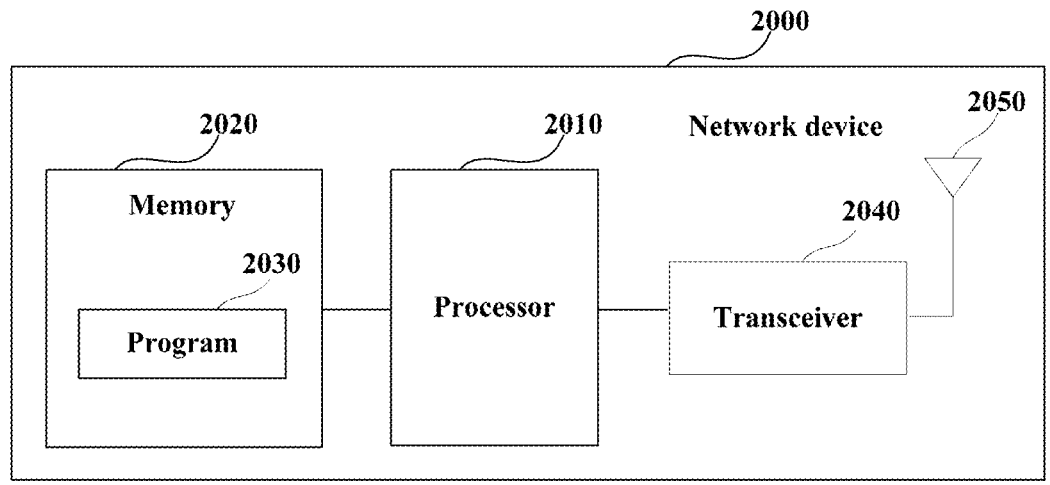
FIG. 20 is a schematic diagram of the network device of an embodiment of this disclosure.

FIG. 20 is a schematic diagram of a structure of the network device of the embodiment of this disclosure. As shown in FIG. 20, a network device 2000 may include a processor 2010 (such as a central processing unit (CPU)) and a memory 2020, the memory 2020 being coupled to the processor 2010. The memory 2020 may store various data, and furthermore, it may store a program 2030 for data processing, and execute the program 2030 under control of the processor 2010.

For example, the processor 2010 may be configured to execute the program 2030 to carry out the method for data reception described in Embodiment 1. For example, the processor 2010 may be configured to execute the following control: transmitting data scheduling control information to a terminal equipment; transmitting first indication information used for indicating one or more frequency-domain bandwidth resources to the terminal equipment; and receiving the uplink data transmitted by the terminal equipment.

For another example, the processor 2010 may be configured to execute the program 2030 to carry out the method for data reception described in Embodiment 3. For example, the processor 2010 may be configured to execute the following control: transmitting data scheduling control information to a terminal equipment; receiving the uplink data transmitted by the terminal equipment; and receiving first indication information used for indicating one or more frequency-domain bandwidth resources transmitted by the terminal equipment.

Furthermore, as shown in FIG. 20, the network device 2000 may include a transceiver 2040, and an antenna 2050, etc. Functions of the above components are similar to those in the relevant art, and shall not be described herein any further. It should be noted that the network device 2000 does not necessarily include all the parts shown in FIG. 20, and furthermore, the network device 2000 may include parts not shown in FIG. 20, and the relevant art may be referred to.

The embodiments of this disclosure further provide a terminal equipment, however, this disclosure is not limited thereto, and it may also be another equipment.

Figure 21:
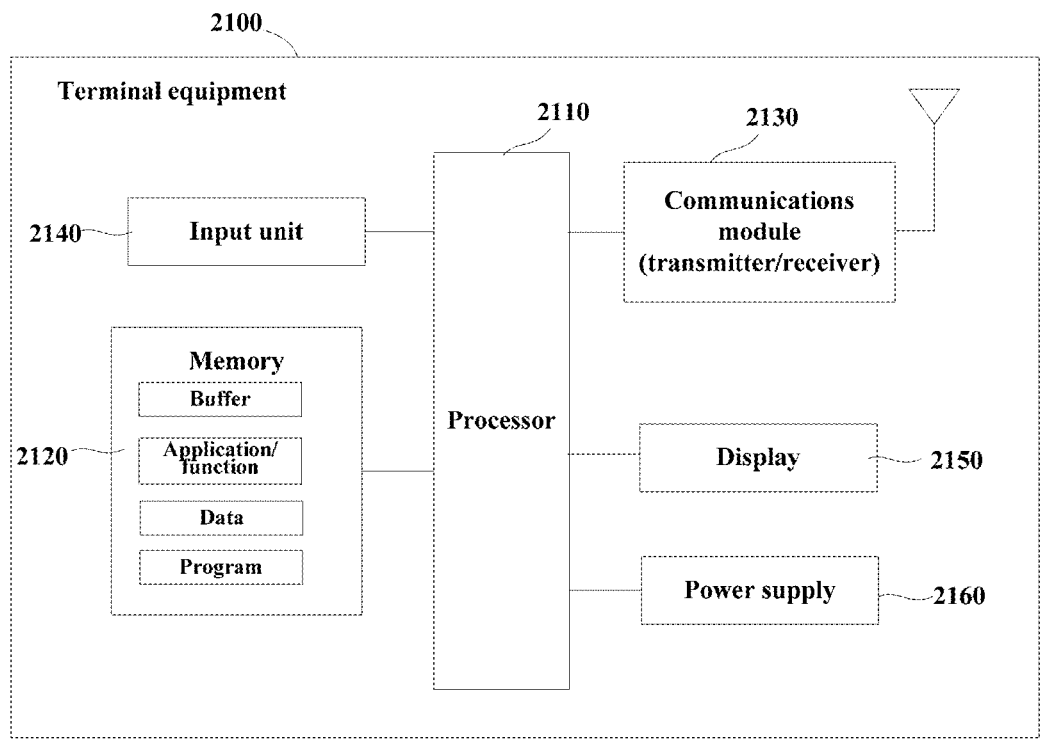
FIG. 21 is a schematic diagram of the terminal equipment of an embodiment of this disclosure.

FIG. 21 is a schematic diagram of the terminal equipment of the embodiment of this disclosure. As shown in FIG. 21, a terminal equipment 2100 may include a processor 2110 and a memory 2120, the memory 2120 storing data and a program and being coupled to the processor 2110. It should be noted that his figure is illustrative only, and other types of structures may also be used, so as to supplement or replace this structure and achieve a telecommunications function or other functions.

For example, the processor 2110 may be configured to execute a program to carry out the method for data transmission described in Embodiment 2. For example, the processor 2110 may be configured to execute the following control: receiving data scheduling control information transmitted by a network device; receiving first indication information used for indicating one or more frequency-domain bandwidth resources transmitted by the network device; and transmitting the uplink data to the network device.

For another example, the processor 2110 may be configured to execute the program to carry out the method for data transmission described in Embodiment 4. For example, the processor 2110 may be configured to execute the following control: receiving data scheduling control information transmitted by a network device; transmitting the uplink data to the network device; and transmitting first indication information used for indicating one or more frequency-domain bandwidth resources to the network device.

As shown in FIG. 21, the terminal equipment 2100 may further include a communication module 2130, an input unit 2140, a display 2150, and a power supply 2160; functions of the above components are similar to those in the relevant art, which shall not be described herein any further. It should be noted that the terminal equipment 2100 does not necessarily include all the parts shown in FIG. 21, and the above components are not necessary. Furthermore, the terminal equipment 2100 may include parts not shown in FIG. 21, and the relevant art may be referred to.

An embodiment of the present disclosure provides a computer readable program code, which, when executed in a network device, will cause the network device to carry out the method for data reception described in Embodiment 1 or 3.

An embodiment of this disclosure provides a computer storage medium, including a computer readable program code, which will cause a network device to carry out the method for data reception described in Embodiment 1 or 3.

An embodiment of the present disclosure provides a computer readable program code, which, when executed in a terminal equipment, will cause the terminal equipment to carry out the method for data transmission described in Embodiment 2 or 4.

An embodiment of this disclosure provides a computer storage medium, including a computer readable program code, which will cause a terminal equipment to carry out the method for data transmission described in Embodiment 2 or 4.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by finning the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A method for data reception, including:
transmitting data scheduling control information by a network device to a terminal equipment, the data scheduling control information being used to indicate the terminal equipment related information for transmitting an uplink data;
transmitting first indication information used for indicating one or more frequency-domain bandwidth resources by the network device to the terminal equipment; and
receiving, by the network device, the uplink data transmitted by the terminal equipment.

Supplement 2. The method according to supplement 1, wherein the network device receives the uplink data on an unlicensed frequency band;
and the network device transmits the first indication information and/or the data scheduling control information on an unlicensed frequency band or a licensed frequency band.

Supplement 3. The method according to supplement 1 or 2, wherein the method further includes:
detecting a channel of an unlicensed frequency band by the network device to determine the one or more frequency-domain bandwidth resources;
and wherein the first indication information is further used to indicate that the one or more frequency-domain bandwidth resources are at least one of the following: a bandwidth resource where the terminal equipment is allowed to transmit uplink data, a bandwidth resource where a network device transmits downlink data, and a bandwidth resource where the terminal equipment is allowed to share a channel occupancy time of the network device to transmit uplink data.

Supplement 4. The method according to any one of supplements 1-3, wherein the first indication information is transmitted after the data scheduling control information.

Supplement 5. The method according to any one of supplements 1-3, wherein the first indication information is transmitted before the data scheduling control information.

Supplement 6. The method according to any one of supplements 1-5, wherein the first indication information and the data scheduling control information are transmitted within the same channel occupancy time.

Supplement 7. The method according to any one of supplements 1-5, wherein the first indication information and the data scheduling control information are transmitted in different channel occupancy times.

Supplement 8. The method according to any one of supplements 1-7, wherein the first indication information is included in first control information carrying uplink data triggering information, the uplink data triggering information being used for triggering the terminal equipment to transmit the uplink data.

Supplement 9. The method according to any one of supplements 1-7, wherein the first indication information is included in second control information different from first control information, the first control information carrying uplink data triggering information used for triggering the terminal equipment to transmit the uplink data.

Supplement 10. The method according to supplement 9, wherein the method further includes:
transmitting the first control information including the uplink data triggering information by the network device to the terminal equipment.

Supplement 11. The method according to any one of supplements 1-10, wherein the data scheduling control information further includes related information used for indicating available time-frequency resources on one or more scheduled bandwidth resources, wherein the available time-frequency resources are used by the terminal equipment for transmitting the uplink data.

Supplement 12. The method according to any one of supplements 1-11, wherein the network device receives the uplink data on available time-frequency resources indicated by the data scheduling control information, or the network device receives the uplink data on a coincided resource of the one or more frequency-domain bandwidth resources and the available time-frequency resources.

Supplement 13. The method according to supplement 11, wherein the scheduled bandwidth resource is of a default size, or the scheduled bandwidth resource is notified to the terminal equipment by the network device in at least one of the following manners:
indicating the scheduled bandwidth resource by the data scheduling control information;
configuring the scheduled bandwidth resource via higher layer signaling; and
configuring the scheduled bandwidth resource via system information.

Supplement 14. The method according to any one of supplements 9-11, wherein the first control information is UE-specific control information or common control information;
and the first control information further includes second indication information used for indicating uplink and downlink structures.

Supplement 15. The method according to supplement 14, wherein the first control information further includes information indicating an effective time length of the first indication information; or, the second indication information is further used for indicating an effective time length of the first indication information.

Supplement 16. The method according to supplement 15, wherein a unit/units of the effective time length and/or the second indication information is/are at least one of symbol, slot, subframe and millisecond.

Supplement 17. The method according to any one of supplements 1-16, wherein if a transmission time instant of the uplink data is within an effective time length of the first indication information, the network device receives the uplink at the transmission time instant;

if the transmission time instant of the uplink data is not within the effective time length of the first indication information, the network device receives the uplink after transmitting a next piece of first indication information.

Supplement 18. The method according to supplement 17, wherein the data scheduling control information includes related information indicating the transmission time instant.

Supplement 19. The method according to any one of supplements 1-18, wherein the first indication information is transmitted on at least one of the following: a set of frequency-domain resources of the one or more frequency-domain bandwidth resources, one of the one or more frequency-domain bandwidth resources, each of the one or more frequency-domain bandwidth resources, and a resource of a licensed frequency band pre-allocated by the network device.

Supplement 20. A method for data transmission, including:

receiving, by a terminal equipment, data scheduling control information transmitted by a network device, the data scheduling control information being used to indicate a terminal equipment related information for transmitting an uplink data;

receiving, by the terminal equipment, first indication information used for indicating one or more frequency-domain bandwidth resources and transmitted by the network device; and transmitting the uplink data by the terminal equipment to the network device.

Supplement 21. The method according to supplement 20, wherein the terminal equipment transmits the uplink data on an unlicensed frequency band;

and the terminal equipment receives the first indication information and/or the data scheduling control information on the unlicensed frequency band or a licensed frequency band.

Supplement 22. The method according to supplement 20 or 21, wherein the first indication information is further used to indicate at least one of the following: a bandwidth resource for the terminal equipment to transmit uplink data, a bandwidth resource for the network device to transmit downlink data, and a bandwidth resource for the terminal equipment to share a channel occupancy time of the network device to transmit uplink data.

Supplement 23. The method according to any one of supplements 20-22, wherein the terminal equipment receives the first indication information after the data scheduling control information.

Supplement 24. The method according to any one of supplements 20-22, wherein the terminal equipment receives the first indication information before the data scheduling control information.

Supplement 25. The method according to any one of supplements 20-24, wherein the first indication information and the data scheduling control information are transmitted within the same channel occupancy time.

Supplement 26. The method according to any one of supplements 20-24, wherein the first indication information and the data scheduling control information are transmitted in different channel occupancy times.

Supplement 27. The method according to any one of supplements 20-26, wherein the first indication information is included in the first control information carrying the uplink data triggering information, the uplink triggering information being used to trigger the terminal equipment to transmit the uplink data.

Supplement 28. The method according to any one of supplements 20-26, wherein the first indication information is included in second control information different from the first control information, the first control information carrying uplink data triggering information used for triggering the terminal equipment to transmit the uplink data.

Supplement 29. The method according to supplement 28, wherein the method further includes:

receiving, by the terminal equipment, first control information including the uplink data triggering information and transmitted by the network device.

Supplement 30. The method according to any one of supplements 20-29, wherein the data scheduling control information further includes related information used for indicating available time-frequency resources on one or more scheduled bandwidth resources, wherein the available time-frequency resources are used by the terminal equipment for transmitting the uplink data.

Supplement 31. The method according to any one of supplements 20-30, wherein the terminal equipment transmits the uplink data on available time-frequency resources indicated by the data scheduling control information, or transmits the uplink data on a coincided resource of the one or more frequency-domain bandwidth resources and the available time-frequency resources.

Supplement 32. The method according to supplement 30, wherein the scheduled bandwidth resource is of a default size, or the scheduled bandwidth resource is notified to the terminal equipment by the network device in at least one of the following manners:

indicating the scheduled bandwidth resource by the data scheduling control information;

configuring the scheduled bandwidth resource via higher layer signaling; and configuring the scheduled bandwidth resource via system information.

Supplement 33. The method according to any one of supplements 28-30, wherein the first control information is UE-specific control information or common control information;

and the first control information further includes second indication information used for indicating uplink and downlink structures.

Supplement 34. The method according to supplement 33, wherein the first control information further includes information indicating an effective time length of the first indication information; or, the second indication information is further used for indicating an effective time length of the first indication information.

Supplement 35. The method according to supplement 34, wherein a unit/units of the effective time length and/or the second indication information is/are at least one of symbol, slot, subframe and millisecond.

Supplement 36. The method according to any one of supplements 20-35, wherein if a transmission time instant of the uplink data is within an effective time length of the first indication information, the terminal equipment transmits the uplink at the transmission time instant;

if the transmission time instant of the uplink data is not within the effective time length of the first indication information, the terminal equipment transmits the uplink after receiving a next piece of first indication information.

Supplement 37. The method according to supplement 36, wherein the data scheduling control information includes related information indicating the transmission time instant.

Supplement 38. The method according to any one of supplements 20-37, wherein the terminal equipment receives the first indication information on at least one of the following resources: the scheduled bandwidth resource, a frequency domain bandwidth resource in the scheduled bandwidth resource, each frequency domain resource of the scheduled bandwidth resource, and a resource pre-allocated by the network device.

Supplement 39. A method for data reception, including:
transmitting data scheduling control information by a network device to a terminal equipment, the data scheduling control information being used to indicate the terminal equipment related information for transmitting an uplink data;
receiving, by the network device, the uplink data transmitted by the terminal equipment; and
receiving, by the network device, first indication information used for indicating one or more frequency-domain bandwidth resources transmitted by the terminal equipment.

Supplement 40. The method according to supplement 39, wherein the network device receives the uplink data on an unlicensed frequency band;
and the network device receives the first indication information and/or the data scheduling control information on the unlicensed frequency band or a licensed frequency band.

Supplement 41. The method according to supplement 39 or 40, wherein the method further includes:
instructing the terminal equipment by the network device to detect a frequency domain bandwidth resource in scheduled bandwidth resources, and determining the one or more frequency-domain bandwidth resources by the terminal equipment according to a result of detection of the scheduled bandwidth resources.

Supplement 42. The method according to supplement 41, wherein the scheduled bandwidth resources are unlicensed frequency band frequency domain resources.

Supplement 43. The method according to supplement 41 or 42, wherein the scheduled bandwidth resource is of a default size, or the scheduled bandwidth resource is notified to the terminal equipment by the network device in at least one of the following manners:
indicating the scheduled bandwidth resource by the data scheduling control information;
configuring the scheduled bandwidth resource via higher layer signaling; and
configuring the scheduled bandwidth resource via system information.

Supplement 44. The method according to any one of supplements 39-43, wherein the first control information is further used to indicate at least one of the following: a bandwidth resource where the terminal equipment transmits the uplink data, a bandwidth resource where the network device is allowed to transmit downlink data, and a bandwidth resource where the network device is allowed to share a channel occupancy time of the terminal equipment to transmit downlink data.

Supplement 45. The method according to any one of supplements 39-44, wherein the first control information is received by the network device after the uplink data.

Supplement 46. The method according to any one of supplements 41-45, wherein the network device receives the first indication information on the scheduled bandwidth resource,
or receives the first indication information on a frequency domain bandwidth resource in the scheduled bandwidth resource,
or receives the first indication information on each frequency domain resource of the scheduled bandwidth resource,
or receives the first indication information on a resource pre-allocated by the network device.

Supplement 47. The method according to any one of supplements 39-46, wherein the method further includes:
transmitting scheduling mode information by the network device to the terminal equipment, the scheduling mode information indicating that the terminal equipment transmits the uplink data by using or not using uplink data triggering information.

Supplement 48. The method according to any one of supplements 39-46, wherein the method further includes:
transmitting channel access mode indication information of an unlicensed frequency band by the network device to the terminal equipment, the channel access mode indication information of the unlicensed frequency band indicating that the terminal equipment determines to transmit the uplink data by using or not using uplink data triggering information.

Supplement 49. The method according to supplement 47 or 48, wherein the network device receives the uplink data after transmitting the uplink data triggering information, the uplink data triggering information being used to trigger the terminal equipment to transmit the uplink data.

Supplement 50. The method according to any one of supplements 39-49, wherein the first indication information includes indication information and/or sequence symbols.

Supplement 51. A method for data transmission, including:
receiving, by a terminal equipment, data scheduling control information transmitted by a network device, the data scheduling control information being used to indicate the terminal equipment related information for transmitting an uplink data;
transmitting the uplink data by the terminal equipment to the network device; and
transmitting first indication information used for indicating one or more frequency-domain bandwidth resources by the terminal equipment to the network device.

Supplement 52. The method according to supplement 51, wherein the terminal equipment transmits the uplink data on an unlicensed frequency band;
and the terminal equipment transmits the first indication information and/or the data scheduling control information on the unlicensed frequency band or a licensed frequency band.

Supplement 53. The method according to supplement 51 or 52, wherein the method further includes:
detecting a frequency domain bandwidth resource in scheduled bandwidth resources by the terminal equipment according to an indication of the network device; and
determining the one or more frequency-domain bandwidth resources by the terminal equipment according to a result of detection of the scheduled bandwidth resources.

Supplement 54. The method according to supplement 53, wherein the scheduled bandwidth resources are unlicensed frequency band frequency domain resources.

Supplement 55. The method according to supplement 53 or 54, wherein the scheduled bandwidth resource is of a default size, or the scheduled bandwidth resource is notified to the terminal equipment by the network device in at least one of the following manners:

indicating the scheduled bandwidth resource by the data scheduling control information;

configuring the scheduled bandwidth resource via higher layer signaling; and configuring the scheduled bandwidth resource via system information.

Supplement 56. The method according to any one of supplements 51-55, wherein the first control information is further used to indicate at least one of the following: a bandwidth resource where the terminal equipment transmits the uplink data, a bandwidth resource where the network device is allowed to transmit downlink data, and a bandwidth resource where the network device is allowed to share a channel occupancy time of the terminal equipment to transmit downlink data.

Supplement 57. The method according to any one of supplements 51-56, wherein the first control information is transmitted by the terminal equipment after the uplink data.

Supplement 58. The method according to any one of supplements 51-57, wherein the terminal equipment transmits the first indication information on the frequency domain resource having transmitting the uplink data, or transmits the first indication information on a frequency domain bandwidth resource in one or more frequency domain bandwidth resources having transmitting the uplink data, or transmits the first indication information on each frequency domain bandwidth resource having transmitting the uplink data, or transmits the first indication information on a resource pre-allocated by the network device.

Supplement 59. The method according to any one of supplements 51-58, wherein the method further includes:

receiving, by the terminal equipment, scheduling mode information transmitted by the network device, the scheduling mode information indicating that the terminal equipment transmits the uplink data by using or not using uplink data triggering information.

Supplement 60. The method according to any one of supplements 51-58, wherein the method further includes:

receiving, by the terminal equipment, channel access mode indication information of an unlicensed frequency band transmitted by the network device, the channel access mode indication information of the unlicensed frequency band indicating that the terminal equipment determines to transmit the uplink data by using or not using uplink data triggering information.

Supplement 61. The method according to supplement 59 or 60, wherein the terminal equipment transmits the uplink data after receiving the uplink data triggering information, the uplink data triggering information being used to trigger the terminal equipment to transmit the uplink data.

Supplement 62. The method according to any one of supplements 51-60, wherein the first indication information includes indication information and/or sequence symbols.

Supplement 63. A network device, including a memory and a processor, the memory storing a computer program, and the processor being configured to execute the computer program to carry out the method for data reception as described in any one of supplements 1-19, or the method for data reception as described in any one of supplements 39-50.

Supplement 64. A terminal equipment, including a memory and a processor, the memory storing a computer program, and the processor being configured to execute the computer program to carry out the method for data transmission as described in any one of supplements 20-38, or the method for data transmission as described in any one of supplements 51-62.

Supplement 65. A network system, including the network device as described in supplement 63 and/or the terminal equipment as described in supplement 64.

What is claimed is:

1. An apparatus for data reception, comprising:

a transmitter configured to:

transmit data scheduling control information to a terminal equipment, the data scheduling control information including related information used for indicating available time-frequency resources on one or more scheduled bandwidth resources, the available time-frequency resources being used by the terminal equipment for transmitting the uplink data, and transmit first indication information including a bitmap used for indicating one or more frequency-domain bandwidth resources to the terminal equipment, the one or more frequency-domain bandwidth resources being bandwidth resource(s) where the terminal equipment is allowed to share a channel occupancy time of a network device to transmit uplink data, wherein the first indication information is included in first control information, the first control information UE-specific control information or common control information, and further comprises second indication information used for indicating an uplink/downlink structure; and a receiver configured to receive the uplink data transmitted by the terminal equipment.

2. The apparatus according to claim 1, wherein the receiver is configured to receive the uplink data on one or more unlicensed frequency bands;

and the transmitter is configured to transmit the first indication information on one or more unlicensed frequency bands or one or more licensed frequency bands, and/or the transmitter is configured to transmit the data scheduling control information on one or more unlicensed frequency bands or one or more licensed frequency bands.

3. The apparatus according to claim 1, further comprising a processor configured to:

control to detect a channel of an unlicensed frequency band to determine the one or more frequency-domain bandwidth resources.

4. The apparatus according to claim 1, wherein the first indication information is transmitted after the data scheduling control information, or the first indication information is transmitted before the data scheduling control information.

5. The apparatus according to claim 1, wherein the first indication information is included in second control information different from first control information, the first control information carrying uplink data triggering information used for triggering the terminal equipment to transmit the uplink data;

and the transmitter is further configured to transmit the first control information including the uplink data triggering information to the terminal equipment.

6. The apparatus according to claim 1, wherein the receiver is further configured to receive the uplink data on a coincided resource of the one or more frequency-domain bandwidth resources and the available time-frequency resources.

7. The apparatus according to claim 1, wherein the one or more scheduled bandwidth resources are of a default size, or the one or more scheduled bandwidth resources are notified to the terminal equipment by a network device in at least one of the following manners:
  indicating the scheduled bandwidth resource by the data scheduling control information;
  configuring the scheduled bandwidth resource via higher layer signaling.

8. The apparatus according to claim 1, wherein the first control information is UE-specific control information.

9. The apparatus according to claim 1, wherein the first control information further comprises information indicating an effective time length of the first indication information; or, the second indication information is further used for indicating an effective time length of the first indication information;
  a unit/units of the effective time length and/or the second indication information is/are at least one of symbol, slot, subframe and millisecond.

10. The apparatus according to claim 1, wherein if a transmission time instant of the uplink data is within an effective time length of the first indication information, the receiver is configured to receive the uplink at the transmission time instant;
  if the transmission time instant of the uplink data is not within the effective time length of the first indication information, the receiver is configured to receive the uplink after transmitting a next piece of first indication information.

11. The apparatus according to claim 1, wherein the first indication information is transmitted on at least one of the following: a set of frequency-domain resources of the one or more frequency-domain bandwidth resources, one of the one or more frequency-domain bandwidth resources, each of the one or more frequency-domain bandwidth resources, and a resource of a licensed frequency band pre-allocated by a network device.

12. An apparatus for data transmission, comprising:
  a receiver configured to:
  receive data scheduling control information transmitted by a network device, the data scheduling control information including related information used for indicating available time-frequency resources on one or more scheduled bandwidth resources, the available time-frequency resources being used by the apparatus for transmitting the uplink data, and
  receive first indication information including a bitmap used for indicating one or more frequency-domain bandwidth resources and transmitted by the network device, the one or more frequency-domain bandwidth resources being bandwidth resource(s) where the apparatus is allowed to share a channel occupancy time of the network device to transmit uplink data,
  wherein the first indication information is included in first control information, the first control information is UE-specific control information or common control information, and further comprises second indication information used for indicating an uplink/downlink structure; and
  a transmitter configured to transmit the uplink data to the network device.

* * * * *